United States Patent
Ye et al.

(10) Patent No.: US 12,022,393 B2
(45) Date of Patent: Jun. 25, 2024

(54) PHYSICAL DOWNLINK CONTROL CHANNEL BASED WAKE UP SIGNAL

(71) Applicant: Apple Inc., Cupertino, CA (US)

(72) Inventors: Qiaoyang Ye, Cupertino, CA (US); Hong He, San Jose, CA (US); Toufiqul Islam, Santa Clara, CA (US); Gregory Ermolaev, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 331 days.

(21) Appl. No.: 17/441,421

(22) PCT Filed: Mar. 27, 2020

(86) PCT No.: PCT/US2020/025507
§ 371 (c)(1),
(2) Date: Sep. 21, 2021

(87) PCT Pub. No.: WO2020/205652
PCT Pub. Date: Oct. 8, 2020

(65) Prior Publication Data
US 2022/0182938 A1    Jun. 9, 2022

Related U.S. Application Data

(60) Provisional application No. 62/826,818, filed on Mar. 29, 2019.

(51) Int. Cl.
*H04B 7/185* (2006.01)
*H04L 1/1812* (2023.01)
(Continued)

(52) U.S. Cl.
CPC ....... *H04W 52/0232* (2013.01); *H04L 1/1812* (2013.01); *H04W 52/0216* (2013.01); *H04W 72/044* (2013.01); *H04W 72/23* (2023.01)

(58) Field of Classification Search
CPC ......... H04W 52/0232; H04W 52/0216; H04W 72/044; H04W 72/23; H04W 52/0219;
(Continued)

(56) References Cited

U.S. PATENT DOCUMENTS 7,952,565 B2 * 5/2011 Park ...................... G06F 3/0416
345/173
8,175,109 B2 * 5/2012 Nogueira-Nine ......................
H04W 52/0219
370/461
(Continued)

FOREIGN PATENT DOCUMENTS

CN            101702823         5/2010
KR       10-2018-0020168        2/2018
(Continued)

OTHER PUBLICATIONS

[No Author Listed], "3rd Generation Partnership Project; Technical Specification Group Radio Access Network; NR; Multiplexing and channel coding (Release 16)," 3GPP TS 38.212, V 16.0.0, Table 7.3.1.1.2-1 of 3GPP TS 38.212, Dec. 2019, 152 pages.
(Continued)

*Primary Examiner* — Amancio Gonzalez
(74) *Attorney, Agent, or Firm* — Fish & Richardson P.C.

(57) ABSTRACT

This disclosure describes methods, systems, and devices for broadcasting a Physical Downlink Control Channel-based (PDCCH-based) wake-up signal. In one example, a method involves receiving, by one or more user equipment (UEs), a configuration for monitoring a wake up signal (WUS). The method further includes monitoring, by the one or more UEs and based on the configuration, a physical downlink control channel (PDCCH) for downlink control information (DCI)
(Continued)

associated with the WUS. The method also includes receiving, by the one or more UEs, the WUS in response to detecting the DCI.

20 Claims, 18 Drawing Sheets

(51) Int. Cl.
  *H04W 52/02* (2009.01)
  *H04W 72/044* (2023.01)
  *H04W 72/23* (2023.01)
(58) Field of Classification Search
  CPC ............ H04W 52/0229; H04W 76/28; H04W 52/0209; H04L 1/1812; H04L 5/0094; H04L 5/001; H04L 5/0053; Y02D 30/70
  USPC ........................................................ 370/318
  See application file for complete search history.

(56) References Cited

U.S. PATENT DOCUMENTS

| | | | | |
|---|---|---|---|---|
| 8,600,379 | B2* | 12/2013 | Kim | H04W 52/0245 455/574 |
| 8,724,536 | B2* | 5/2014 | Gao | H04W 72/30 725/62 |
| 8,774,138 | B2* | 7/2014 | Ramos | H04W 72/52 370/336 |
| 9,872,252 | B1 | 1/2018 | Ang et al. | |
| 9,986,452 | B2* | 5/2018 | Liu | H04W 76/28 |
| 10,004,099 | B2* | 6/2018 | Johansson | H04W 76/28 |
| 10,159,109 | B2* | 12/2018 | Kanesalingam | H04W 72/30 |
| 10,211,838 | B2* | 2/2019 | Liu | H03L 1/026 |
| 10,285,129 | B2* | 5/2019 | Song | H04W 52/0235 |
| 10,425,199 | B2* | 9/2019 | Chen | H04W 72/20 |
| 10,594,468 | B2* | 3/2020 | Liao | H04W 72/1273 |
| 10,743,257 | B2* | 8/2020 | Liu | H04W 52/0229 |
| 10,805,979 | B2* | 10/2020 | Chakraborty | H04W 76/28 |
| 10,863,436 | B2* | 12/2020 | Jeong | H04W 52/0216 |
| 10,966,155 | B1* | 3/2021 | Kasslin | H04W 76/28 |
| 10,986,572 | B2* | 4/2021 | Gan | H04W 52/0235 |
| 11,013,018 | B2* | 5/2021 | Shi | H04L 5/0007 |
| 11,032,047 | B2* | 6/2021 | Liu | H04W 52/0229 |
| 11,076,381 | B2* | 7/2021 | Bhatoolaul | H04W 52/0216 |
| 11,089,549 | B2* | 8/2021 | Nam | H04W 52/028 |
| 11,089,570 | B2* | 8/2021 | Yi | H04L 5/0055 |
| 11,284,477 | B2* | 3/2022 | Islam | H04W 76/11 |
| 11,356,949 | B2* | 6/2022 | Xu | H04W 76/28 |
| 11,363,668 | B2* | 6/2022 | Tang | H04W 72/0466 |
| 11,388,669 | B2* | 7/2022 | Medles | H04W 52/0229 |
| 11,483,768 | B2* | 10/2022 | He | H04W 28/0284 |
| 11,483,866 | B2* | 10/2022 | Myung | H04L 5/00 |
| 11,490,334 | B2* | 11/2022 | Zhou | H04L 1/1614 |
| 11,503,639 | B2* | 11/2022 | Myung | H04W 74/0808 |
| 11,516,737 | B2* | 11/2022 | Kim | H04W 52/0229 |
| 11,553,430 | B2* | 1/2023 | Kwon | H04W 52/0232 |
| 11,564,166 | B2* | 1/2023 | Nam | H04L 5/0051 |
| 11,564,282 | B2* | 1/2023 | Jiang | H04W 52/0248 |
| 11,606,751 | B2* | 3/2023 | Lee | H04W 76/28 |
| 11,647,464 | B2* | 5/2023 | Reial | H04W 52/0235 370/311 |
| 11,722,916 | B2* | 8/2023 | Xia | H04W 76/28 370/252 |
| 11,729,810 | B2* | 8/2023 | Xia | H04W 72/542 370/329 |
| 11,729,857 | B2 | 8/2023 | Islam et al. | |
| 2012/0275366 | A1* | 11/2012 | Anderson | H04W 52/0219 370/311 |
| 2013/0215853 | A1 | 8/2013 | Li et al. | |
| 2015/0195780 | A1* | 7/2015 | Liu | H04W 52/0216 370/311 |
| 2015/0208462 | A1* | 7/2015 | Lee | H04W 72/23 370/311 |
| 2015/0230180 | A1* | 8/2015 | Lim | H04W 76/14 370/315 |
| 2016/0286603 | A1 | 9/2016 | Vajapeyam et al. | |
| 2016/0373233 | A1 | 12/2016 | Pelletier et al. | |
| 2018/0027927 | A1 | 2/2018 | Fisher et al. | |
| 2018/0077688 | A1* | 3/2018 | Yi | H04W 16/14 |
| 2018/0084501 | A1* | 3/2018 | Mu | H04W 52/0235 |
| 2018/0279274 | A1 | 9/2018 | Sun et al. | |
| 2018/0332655 | A1 | 11/2018 | Ang et al. | |
| 2019/0254110 | A1* | 8/2019 | He | H04L 5/0048 |
| 2020/0027529 | A1 | 1/2020 | Mitani et al. | |
| 2020/0029315 | A1* | 1/2020 | Lin | H04W 24/08 |
| 2020/0037247 | A1 | 1/2020 | Liao et al. | |
| 2020/0037396 | A1 | 1/2020 | Cheng et al. | |
| 2020/0092073 | A1 | 3/2020 | Papasakellariou et al. | |
| 2020/0092813 | A1 | 3/2020 | Kim et al. | |
| 2020/0221384 | A1* | 7/2020 | Ang | H04W 76/28 |
| 2020/0275296 | A1 | 8/2020 | Chen et al. | |
| 2020/0314747 | A1 | 10/2020 | Zhou et al. | |
| 2020/0337038 | A1 | 10/2020 | Takeda et al. | |
| 2020/0367193 | A1* | 11/2020 | Cha | H04W 48/12 |
| 2021/0168781 | A1* | 6/2021 | Lee | H04W 72/23 |
| 2021/0176710 | A1* | 6/2021 | Tooher | H04W 76/28 |
| 2021/0195521 | A1 | 6/2021 | Muller et al. | |
| 2021/0259044 | A1 | 8/2021 | Islam et al. | |
| 2021/0314866 | A1 | 10/2021 | Lee et al. | |
| 2021/0321333 | A1* | 10/2021 | Miao | H04W 52/0274 |
| 2021/0345124 | A1* | 11/2021 | Myung | H04W 16/14 |
| 2021/0360532 | A1 | 11/2021 | Jiang et al. | |
| 2021/0368438 | A1 | 11/2021 | Li et al. | |
| 2021/0368444 | A1* | 11/2021 | Wang | H04W 52/0235 |
| 2022/0007408 | A1* | 1/2022 | Xu | H04W 52/0229 |
| 2022/0022137 | A1 | 1/2022 | Xue et al. | |
| 2022/0086756 | A1* | 3/2022 | Reial | H04W 52/0229 |
| 2022/0116875 | A1* | 4/2022 | Nimbalker | H04W 52/0216 |
| 2022/0174137 | A1 | 6/2022 | Lee et al. | |
| 2022/0210736 | A1 | 6/2022 | Ye et al. | |
| 2023/0145663 | A1* | 5/2023 | Kwon | H04L 5/0057 370/318 |

FOREIGN PATENT DOCUMENTS

| | | |
|---|---|---|
| WO | WO 2018132100 | 7/2018 |
| WO | WO 2018175760 | 9/2018 |
| WO | WO 2019030335 | 2/2019 |

OTHER PUBLICATIONS

[No Author Listed], "5G; NR; Medium Access Control (MAC) protocol specification (3GPP TS 38.321 version 16.1.0 Release 16)," ETSI TS 1 38.231, V 16.1.0, Jul. 2020, 153 pages.

[No Author Listed], "5G; NR; Physical channels and modulation (3GPP TS 38.211 version 16.2.0 Release 16)," ETSI TS 1 38.211, V 16.2.0, subclause 6.4.1.1.3 of 3GPP TS 38.211, Jul. 2020, 136 pages.

[No Author Listed], "5G; NR; Physical channels and modulation (3GPP TS 38.211 version 16.2.0 Release 16)," ETSI TS 1 38.211, V 16.2.0, Subclause 7.4.1.1.2 of 3GPP TS 38.211, Jul. 2020, 136 pages.

[No Author Listed], "5G; NR; Physical layer procedures for control (3GPP TS 38.213 version 15.3.0 Release 15)," ETSI TS 1 38.213, V 15.3.0, Subclause 9.2.3 of 3GPP TS 38.213, Oct. 2018, 102 pages.

[No Author Listed], "5G; NR; Physical layer procedures for control (3GPP TS 38.213 version 16.2.0 Release 16)," ETSI TS 1 28.213, V 16.2.0, Subclause 11.1 of 3GPP TS 38.213, Jul. 2020, 180 pages.

[No Author Listed], "5G; NR; Physical layer procedures for data (3GPP TS 38.214 version 15.3.0 Release 15)," ETSI TS 1 38.214, V 15.3.0, Subclause 6.1.2.1.1 of 3PP TS 38.214, Oct. 2018, 99 pages.

[No Author Listed], "5G; NR; Physical layer procedures for data (3GPP TS 38.214 version 15.3.0 Release 15)," ETSI TS 1 38.214, V15.3.0, Subclause 5.1.2.1.1 of 3GPP TS 38.214, Oct. 2018, 99 pages.

[No Author Listed], "5G; NR; Physical layer procedures for data (3GPP TS 38.214 version 16.2.0 Release 16)," ETSI TS 1 38.214, V 16.2.0, Jul. 2020, 167 pages.

(56) References Cited

OTHER PUBLICATIONS

Apple Inc., "Power Saving Techniques based on UE Adaptation," 3GPP TSG-RAN WG1 Meeting Ad-Hoc 1901, R1-1900753, Taipei, Taiwan, Jan. 21-25, 2019, 12 pages.
Ericsson, "DRX with short on-Duration and Wake-up signaling, " R2-1811627, 3GPP TSG-RAN WG2 #103, Gothenburg, Sweden, Aug. 20-24, 2018, 3 pages.
Ericsson, "Techniques for UE Power Saving," 3GPP TSG-RAN WG1 Meeting #96, Tdoc R1-1902935, Athens, Greece, Feb. 25-Mar. 1, 2019, 15 pages.
Ericsson, "Triggers for NR UE power saving," 3GPP TSG-RAN WG1 Meeting AH-1901, Tdoc R1-1901167, Taipei, Taiwan, Jan. 21-25, 2019, 13 pages.
Ericsson, "Wake-up signal configurations and procedures for NB-IoT," R1-1805855, 3GPP WG1 Meeting #93, Busan, Korea, May 20-24, 2018, 9 pages.
International Preliminary Report on Patentability in International Appln. No. PCT/US2020/025507, dated Oct. 14, 2021, 10 pages.
International Search Report and Written Opinion in International Appln. No. PCT/US2020/025507, dated Jun. 23, 2020, 18 pages.
Qualcomm Incorporated, "Efficient monitoring of DL control channels," R1-1804914, 3GPP TSG RAN WG1 Meeting #92bis, Sanya, China, Apr. 16-20, 2018, 13 pages.
Qualcomm Incorporated, "Potential Techniques for UE Power Saving," 3GPP TSG-RAN WG1 #96, R1-1903016, Athens, Greece, Feb. 25-Mar. 1, 2019, 33 pages.
Qualcomm Incorporated, "Triggering Adaptation of UE Power Consumption Characteristics," 3GPP TSG-RAN WG1 Meeting #94bis, R101811283, Chengdu, China, Oct. 8-12, 2018, 12 pages.
ZTE, "Evaluation results of UE power consumption," 3GPP TSG RAN WG1 Meeting #96, R1-1902030, Athens, Greece, Feb. 25-Mar. 1, 2019, 17 pages.
[No Author Listed], "3rd Generation Partnership Project; Technical Specification Group Radio Access Network; NR; Study on UE Power Saving (Release 16)," 3GPP TR 38.840 V0.1.1, Feb. 2019, 34 pages.
Catt et al., "New WID: UE Power Saving in NR," 3GPP TSG RAN Meetings #83 RP-190727, Shenzhen, China, Mar. 18-21, 2019, 5 pages.

* cited by examiner

PHYSICAL DOWNLINK CONTROL CHANNEL BASED WAKE UP SIGNAL

CROSS-REFERENCE TO RELATED APPLICATION

This application is a National Stage Application under 35 U.S.C. 0.371 of International Application No. PCT/US2020/025507, filed on Mar. 27, 2020, which claims the benefit of the priority of U.S. Provisional Patent Application No. 62/826,818, entitled "DESIGN OF USER EQUIPMENT GROUP PHYSICAL DOWNLINK CONTROL CHANNEL BASED WAKE UP SIGNAL OR CHANNEL" and filed on Mar. 29, 2019. The above-identified applications are incorporated herein by reference in their entirety.

TECHNICAL FIELD

This disclosure relates generally to signaling in wireless communication systems.

BACKGROUND

User equipment (UE) can wirelessly communicate data using wireless communication networks. To wirelessly communicate data, the UE connects to a node of a radio access network (RAN) and synchronizes with the network.

SUMMARY

This disclosure describes methods, systems, and devices for broadcasting a Physical Downlink Control Channel-based (PDCCH-based) wake-up signal.

In accordance with one aspect of the present disclosure, a method involves receiving, by one or more user equipment (UEs), a configuration for monitoring a wake up signal (WUS), where the configuration includes information indicative of one or more of: one or more component carriers (CCs), a bandwidth part (BWP), a control resource set (CORESET), and a search space (SS). The method further includes monitoring, by the one or more UEs and based on the configuration, a physical downlink control channel (PDCCH) for downlink control information (DCI) associated with the WUS. The method also includes receiving, by the one or more UEs, the WUS in response to detecting the DCI.

Other versions include corresponding systems, apparatus, and computer programs to perform the actions of methods defined by instructions encoded on computer readable storage devices. These and other versions may optionally include one or more of the following features.

In some implementations, the configuration further includes information indicative of one or more of: a starting position of a UE specific field block; a size of the UE specific field block; an information field; a plurality of component carriers (CCs) that share a radio frequency (RF) chain, where the plurality of component carriers comprise a primary cell (PCell) and a secondary cell (SCell); a number of discontinuous reception (DRX) cycles; a resource allocation for a physical uplink control channel (PUCCH), a physical uplink shared channel (PUSCH), a modulation and coding scheme (MCS), a redundancy version (RV), or a hybrid acknowledge request (HARQ) process for the PUSCH; a transmit power control (TPC) command for the PUCCH, the PUSCH, the MCS, the RV, or the HARQ process for the PUSCH; a field size of a common field; a pair of a BWP and CC; a timer indicating a duration after which the UE should revert to a default scheduling scheme; and one or more time domain resource allocation (TDRA) tables.

In some implementations, the DCI includes an indication of one or more of: a wake up duration for the one or more UEs; a wake up duration, a BWP associated with one or more CCs, aperiodic channel state information (A-CSI) for triggering CSI associated with one or more CCs, a resource allocation, a transmit power control (TPC) command, a modulation and coding scheme (MCS), a redundancy version (RV), a hybrid acknowledge request (HARQ) process for a physical uplink shared channel (PUSCH), or an antenna adaptation.

In some implementations, the monitoring is performed when the one or more UEs are operating in a discontinuous reception off (DRX-OFF) state.

In some implementations, monitoring the PDCCH for the DCI associated with the WUS is prioritized over monitoring the PDCCH for other types of DCI.

In some implementations, the one or more UE includes a plurality of UEs, and where the WUS includes at least one of: (i) information that applies to each UE of the plurality of UEs, or (ii) information that is specific to one UE of the plurality of UEs.

In some implementations, the WUS is specific to the one or more UEs.

In some implementations, the WUS is enabled or disabled by higher layer signaling, where the higher layer signaling includes cell-specific signaling or UE-specific signaling.

In some implementations, the PDCCH shares a common search space (CSS) with an existing DCI format.

In some implementations, a search space (SS) for the PDCCH is configured by high layer signaling, where a configuration includes at least one of: periodicity, offset, duration, control resource set (CORESET) identifier (ID), search space (SS) ID, transmission configuration indication (TCI) state, common search space (CSS) flag, or aggregation levels (ALs).

In some implementations, the one or more UEs monitor the wake up DCI during a DRX-off period.

In some implementations, monitoring of the DCI is prioritized.

In some implementations, the method further including: a set of search spaces (SSs) or control resource sets (CORESETs) with different transmission configuration indication (TCI) states is configured, and where the different SSs or CORESETs with different TCI states are located in a number of consecutive symbols within one or two consecutive slots of WUS monitoring window.

In some implementations, a DCI payload includes: (i) a common indication block that applies to all of the one or more UEs, or (ii) a UE-specific information block that applies to one UE of the one or more UEs.

In some implementations, the DCI includes a common indication block and a plurality of UE-specific indication blocks, where the UE-specific indication blocks include a plurality of fields including indication functions, where the plurality of fields each include information for different CCs or CC groups, and where the information is shared among the different CCs or CC groups.

In some implementations, the DCI includes a common indication block and a plurality of UE-specific indication blocks, where the UE-specific indication blocks each include indication information for different CCs, and where each field for a CC further includes indication information for that CC.

In some implementations, the DCI includes indication information for different CCs, where, for each CC, the indication information further includes a common indication block and a plurality of UE-specific indication blocks.

In some implementations, the DCI includes a wake up indication that indicates whether a UE should wake up for next N DRX cycles, where N is a predetermined number or is indicated by the DCI.

In some implementations, the configuration further includes pairs of BWP and CC groups is to be activated by the WUS.

In some implementations, the one or more component carriers (CCs) are a plurality of CCs that comprise a primary cell and secondary cells, where a UE stops PDCCH monitoring on either all secondary cells (SCells) or a subset of SCells when it is switched to a first BWP on a primary cell (PCell) or when it is switched to a first search space (SS) on the first BWP on the PCell.

In some implementations, the DCI further includes an aperiodic channel state information (A-CSI) trigger that triggers a channel state information (CSI) report on component carriers (CCs) to be woken up by the WUS.

In some implementations, the channel state information (CSI) report is carried in a physical uplink shared channel (PUSCH).

In some implementations, the DCI includes a wake up duration in units of discontinuous reception (DRX) cycles.

In some implementations, the DCI includes an antenna adaptation, where the antenna adaptation is indicative of at least one of: a number of receiving (Rx) antenna chains between 2 and 4 or a maximum number of multiple-input and multiple-output (MIMO) layers used for a physical downlink shared channel (PDSCH) scheduling within a given wake up period for both a physical downlink control channel (PDCCH) and the PDSCH.

In accordance with one aspect of the present disclosure, a method involves generating a configuration for monitoring a wake up signal (WUS), where the configuration includes information indicative of one or more of: one or more component carriers (CCs), a bandwidth part (BWP), a control resource set (CORESET), and a search space (SS). The method further includes transmitting the configuration to one or more UEs. The method also includes transmitting, on a physical downlink control channel (PDCCH), a downlink control information (DCI) associated with the WUS.

BRIEF DESCRIPTION OF DRAWINGS

Like reference symbols in the various drawings indicate like elements.

DETAILED DESCRIPTION

Figure 1A:
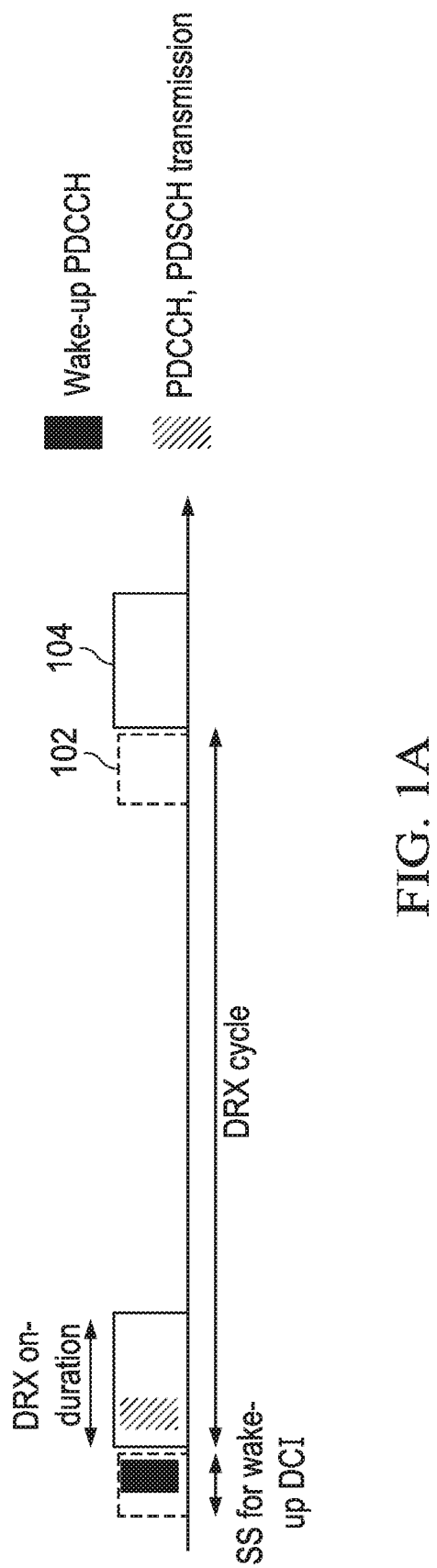
FIGS. 1A and 1B each illustrate a wake up PDCCH configuration, according to some implementations of the present disclosure.

One of the desired features of user equipment (UE) in fifth generation (5G) technology is the reduction of UE power, which, among other things, extends UE battery life. 3GPP 5G New radio (NR) supports paging, discontinuous reception (DRX) operation, and bandwidth part (BWP) adaptation to save UE power.

This disclosure describes methods and systems for a wake-up signal or channel that results in UE power savings. More specifically, the disclosed methods and systems describe a Physical Downlink Control Channel-based (PDCCH-based) wake-up signal in radio resource control (RRC) connected mode. In one embodiment, the PDCCH-based wake-up signal involves UE GROUP PDCCH signaling, which strikes a balance between the overhead and efficiency of a UE power saving scheme. In this disclosure, a UE GROUP wake-up PDCCH is defined as a wake-up PDCCH that denotes a downlink control information (DCI) transmitted to a group of UEs in a group-specific PDCCH. The DCI at least signal to one or more UEs to wake up from DRX-OFF state to monitor scheduling DCIs from the network in one or more carriers. As described herein, the DCI may additionally include other information and signaling.

Furthermore, this disclosure describes an architecture of a PDCCH-based wake up signal or channel transmitted to a group of UEs. In particular, the disclosure describes the details of the configuration and capabilities of the PDCCH-based wake up signal, a UE operation of monitoring the PDCCH-based wake up channel, and content of the DCI.

I. Configuration

In an embodiment, supporting a wake up signal or channel may be UE capability. Alternatively, this feature can be mandatory for NR UEs.

In an embodiment, the wake up signal/channel ("WUS") may be enabled/disabled by higher layer signaling, such as cell-specific signaling (e.g., system information (SI)) or UE-specific signaling (e.g., a UE-specific RRC message). Additionally and/or alternatively, the payload and/or size of the wake up signal/channel may be configured by higher layer signaling.

In an embodiment, a UE may be provided a configuration for WUS monitoring including one (e.g., a primary carrier) or more component carriers (e.g., both primary cell (PCell) and secondary cell (SCell)), a corresponding bandwidth part (BWP), a control resource set (CORESET), and a search space (S S). In some examples, a CORESET configured in the active, default, or initial downlink (DL) BWP for common search space (CSS) or UE specific search space (USS) can be used for the wake up PDCCH. The SS for the wake up PDCCH can share the CSS with one of the existing DCI formats (e.g., Type 0, 0A, 1, 2 or 3 CSS in NR systems). However, this may increase the blocking probability of WUS since the CSS is shared by legacy UEs. To address this issue, alternatively a new type of SS (e.g., a dedicated SS or group-specific SS monitored by a group of UEs) may be defined for the wake up PDCCH.

In one embodiment, an existing SS set configuration method (e.g., via higher layer information element (TE) search-space-config) can be reused. In this embodiment, with appropriate configuration of the parameters monitoringSlotPeriodicityAndOffset and Duration, the SS for the UE group wake up signal/channel may be aligned with UEs' DRX cycle, if the UEs belonging to the same group are configured with a similar DRX pattern. Thus, a gap between the wake up PDCCH and its associated DRX on-duration(s) may be minimized. Alternatively, the configuration of SS can be independent of DRX configuration. Here, the UE may wake up and monitor the wake up PDCCH in the configured SS. Doing so can reduce WUS signaling overhead by sharing a WUS signal with multiple UEs at the cost of potential increased power consumption at the UE side.

In another embodiment, the existing SS set configuration can be extended. In this embodiment, the monitoring periodicity can be in unit of DRX cycles, which may be predefined (e.g., fixed in specification) or signaled (e.g., as part of the search space set configuration). An offset with respect to the start of DRX on-duration can be predefined or signaled (e.g., as part of the search space set configuration). The existing parameter for indicating offset in search-space-IE may be reinterpreted for this purpose. In examples where the offset is signaled, the start of the search space may be calculated as (t-offset-duration), where t denotes the start of DRX on-duration for the first DRX cycle associated with the wake up PDCCH, and the duration is indicated by the parameter Duration in the search space set configuration IE. In some examples, the offset may depend on UE capability. For instance, the UE can first report its capability regarding the gap between the end of wake up DCI to the start of DRX on-duration, which would determine the offset value accordingly (e.g., the offset is equal to the gap indicated by the UE). In some examples, the gap value needed by the UE may take into account the need for (i) retuning RF components for different CCs (in the scenario of Carrier Aggregation (CA)) or the target BWP in the same CC, and (ii) UE processing capability for time/frequency tracking and detection of wake up DCI.

The configuration of other parameters, including CORESET ID, search space ID, TCI-state, Common-search-space flag, RNTI-monitoring, USS-DCI-format, Aggregation-level-1, Aggregation-level-2, . . . , Aggregation-level-16, and monitoringSymbolsWithinSlot can reuse an existing configuration method (e.g., configured in the higher layer IE search-space-config). In some examples, the maximum aggregation levels (ALs) for WUS monitoring may be limited to a smaller number (e.g., 1 or 2 ALs) than found in the existing methods. The exact AL values can be configured by RRC signaling on a per UE basis to further reduce power consumption in WUS detection. Additionally, the CORESET may be limited to contiguous RBs without the need to indicate in RRC signaling so as to minimize the RF bandwidth of WUS monitoring and signaling overhead. Note that a new DCI format and/or Radio Network Temporary Identifier (RNTI) can be introduced for the wake up PDCCH. The UEs configured to monitor the same RNTI belong to the same group.

In addition to the described configuration aspects, the following parameters additionally and/or alternatively can be configured for a wake up PDCCH. One parameter is the starting position of a UE specific field block in the wake up DCI. In one embodiment where the UE-specific field block has the same size for all the UEs belonging to the same group, the starting position of the UE specific field block can be indicated via a UE-specific index within the group. For example, denoting the maximum size of the group to be G, each UE may be assigned with an index with a potential value from 0 to G−1. Thus, ceil(log 2(G)) bits may be used for this indication. In another embodiment where the UE-specific field block can have different sizes for different UEs in the group, denoting the size of the DCI by S1 and the size of the common field by S2, the starting position of the UEs can be indicated by ceil(log 2(S1−S2)).

Alternatively, to reduce the number of bits, the possible size for a UE specific field can be limited (e.g., to only 2 possible sizes or 3 possible sizes). As such, the possible starting positions may be reduced to certain positions. For example, denoting the possible sizes for the UE specific field by X1, X2, . . . , Xn, the starting position can be indicated as N1*X1+N2*X2+ . . . +Nn*Xn, where Ni denotes the number of possible starting positions for a size of Xi. For example, Ni=ceil(X/Xi), where X is the total size of UE-specific fields of the wake up DCI. In yet another embodiment, the starting bit position of a UE-specific field block within the WUS DCI for a single component carrier (CC) or a group of CCs may be explicitly indicated by higher layers. In addition, the information elements (IEs) within the block and their sizes can be separately considered on a per CC basis.

Another parameter that can be configured is the size of the UE specific field in the wake up DCI for the UE. In an example, the configuration may be used in the configuration where the UE specific field may have different sizes for different UEs in the same group. In one embodiment, the size of each field in a field block is fixed in specification and the presence for a given CC is configured by higher layers.

Figure 3:
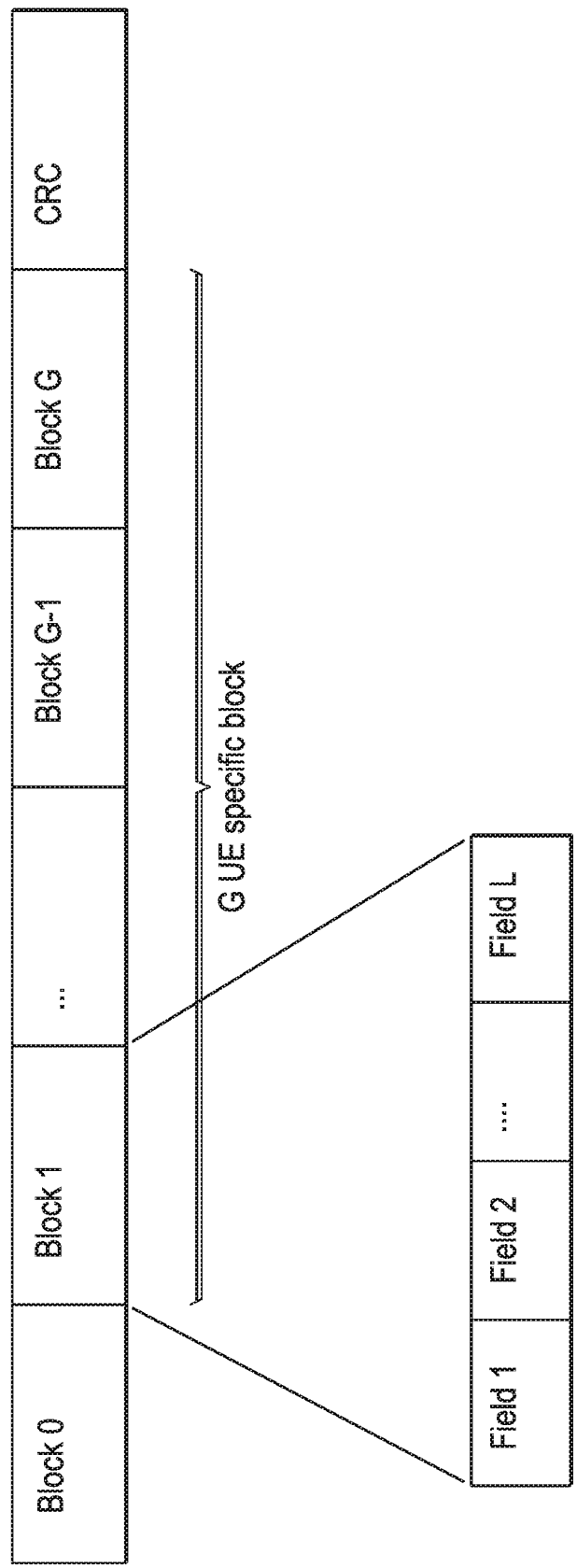
FIG. 3 illustrates an example of the wake up DCI structure, according to some implementations of the present disclosure.

Another parameter that can be configured is UE specific information fields. For example, there can be n kinds of information fields that may be UE specific. A size n bitmap may be used to indicate which field(s) should be UE specific. The bitmap may be indicated by the wake up DCI. For example, as illustrated in FIG. 3, a size L bitmap may be included in the wake up DCI. Alternatively, the size of the UE specific fields can imply which field(s) is UE specific if the sizes of the candidate UE specific fields are different from each other.

Another parameter that can be configured is grouping of CCs to share the same indication in wake up DCI. More specifically, the CCs configured for the UE can be categorized into multiple groups. The grouping can be implemented based on the UE-assist information. In some examples, the CCs with a shared radio frequency (RF) chain may be suitable to wake up or DRX simultaneously to minimize power consumption. More specifically, this parameter indicates how the CCs are grouped to share the same indication of the wake up DCI (e.g., how many CC groups are configured and which CCs belongs to which CC group).

Another parameter that can be configured is a number of DRX cycles associated with the wake up DCI. In some embodiments, each wake up DCI can be associated with multiple DRX cycles. The number of DRX cycles that the UE will keep monitoring once a wake up DCI is received can be configured semi-statically via higher layer signaling. Alternatively, the number of DRX cycles associated with the wake up DCI can be dynamically indicated in the wake up DCI as described herein.

Another parameter that can be configured is a resource allocation and/or transmit power control (TPC) command for physical uplink control channel (PUCCH), physical uplink shared channel (PUSCH), modulation and coding scheme (MCS), redundancy version (RV), and/or hybrid acknowledge request (HARQ) process for PUSCH. If aperiodic channel state information (A-CSI) triggering is supported by a wake up physical downlink control channel (PDCCH), then the PUCCH can be used to carry the A-CSI report triggered by the wake up PDCCH before physical downlink shared channel (PDSCH) or PUSCH scheduling. To support this feature, a set of uplink (UL) resources for PUCCH can be configured by higher layer signaling and a PUCCH resource is signaled as part of a WUS signal. In some other examples, the TPC command for PUCCH can be configured by higher layer signaling.

In one example, as a part of the time-domain resource assignment, a timing indicator can be introduced to capture the gap between the wake up DCI and the PUCCH carrying the CSI report. Similar to a PDSCH-to-HARQ feedback timing indicator, a set of possible values can be configured by higher layer signaling, and the wake up DCI can indicate which value is to be used. Alternatively, the exact value of the timing gap can be configured by higher layer signaling.

In another example, A-CSI triggering is supported by wake up PDCCH and PUSCH is used to carry the CSI report triggered by the wake up PDCCH. In this option, the resource allocation, TPC command, MCS, RV and/or HARQ process for the PUSCH transmission can be configured by higher layer signaling. In another embodiment, a set of PUSCH resources may be first configured by RRC signaling and then one of the set is dynamically selected by the WUS signal to carry A-CSI information. Additionally, a QPSK modulation scheme is used for this CQI-only PUSCH transmission, and the CSI-RS offset relative to the slot where WUS signal is transmitted is also indicated as part of the WUS signal, as described herein.

Another parameter that can be configured is the field size of the common field. This parameter indicates the size of each field in the common block.

Another parameter that can be configured is the pairs of BWP and CC or CC groups to be activated by the wake up PDCCH. Specifically, a list of paired <active DL BWP, active CC> can be configured by the higher layer signaling, and which pair(s) are to be activated may be indicated by the BWP indicator in the wake up PDCCH. The set of BWP and CC (group) pairs can be configured on a per UE basis.

Another parameter that can be configured is a timer that indicates a duration after which the UE should fall back to a default scheduling scheme (either cross-slot or same-slot scheduling). In an example, the timer can be configured on a per UE basis.

Another parameter that can be configured is multiple Time Domain Resource Allocation (TDRA) tables. Here, which TDRA table among those configured is to be used may be indicated by the wake up PDCCH in the "cross-slot scheduling" field.

II. UE Monitoring of the Wake Up PDCCH

Figure 1B:
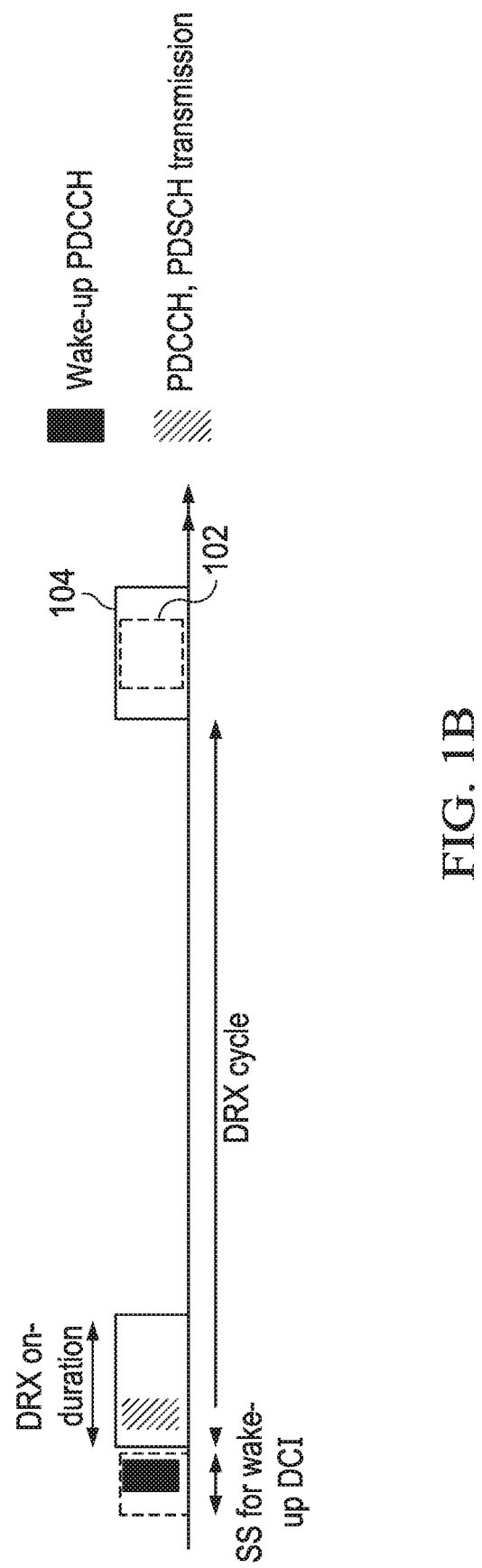

FIGS. 1A and 1B each illustrate a wake up PDCCH configuration, according to some implementations. As shown in FIG. 1A, in an embodiment, a wake up PDCCH SS 102 may be configured before a DRX on-duration 104. In another embodiment, and as shown in FIG. 1B, the wake up PDCCH SS 102 may appear during the DRX on-duration 104.

In an embodiment, the CSS or group-specific SS (GSS) for the wake up PDCCH may be prioritized, such that the UE is not required to simultaneously monitor the wake up PDCCH and other DCI formats. In some examples, when the medium access control (MAC) entity is not Active, the UE may monitor PDCCH candidates for WUS in the GSS within one or more CORESETS on certain BWP and CCs that are configured by higher layers. For instance, the UE may only monitor GSS in one configured BWP on its own PCell. To reduce UE complexity, the UE may only monitor wake up PDCCH in the duration configured for wake up PDCCH SS. Within examples, this configuration can be used when the wake up PDCCH is configured to be monitored only during DRX off period (e.g., as illustrated in FIG. 1A). In one example, for the scenario where the wake up PDCCH SS occurs during the DRX on-duration and/or before the expiration of in-activity timer, the UE may not be required to monitor these wake up PDCCH SSs.

In an embodiment, the CSS or GSS for the wake up PDCCH may be prioritized, such that the UE is not required to simultaneously monitor other DCI formats in the CSS or GSS. The UE can still monitor the USS if so configured. Within examples, this configuration may be used when the wake up PDCCH may be configured during DRX-on duration and/or before DRX inactivity timer expires (e.g., as illustrated in FIG. 1B) and the UE is required to monitor these wake up PDCCH SSs during DRX-on duration and/or before DRX inactivity timer expires. The wake up PDCCH in this case may be used to indicate that the UE needs to wake up in the next upcoming DRX cycle(s).

Alternatively, in cases where CSS or GSS for wake up PDCCH is configured during the DRX on-duration and/or before DRX inactivity timer expires (e.g., as illustrated in FIG. 1B), the UE may not be required to monitor the wake up PDCCH. In other words, the UE may be required to monitor the wake up PDCCH only in the CSS or GSS configured for it when the UE is in the DRX off period. During the on period, the monitoring of other DCI formats may be prioritized.

In yet another embodiment, there is no prioritization among SSs. In this embodiment, the UE may monitor all SSs if configured in a given time instance.

To reduce the number of blind detections, and thus, reduce UE complexity, another embodiment involves limiting the supported ALs for the wake up PDCCH. In one example, considering that the wake up PDCCH applies to a group of UEs, it can support only larger ALs. This can be achieved by providing 0 for the number of PDCCH candidates for certain aggregation level(s) in the IE of search-space-config. Alternatively, the supported aggregation levels can be predefined in specification. In some other examples, the supported ALs for the WUS may be configured by higher layers on a per UE basis as part of WUS configuration, as discussed herein. This configuration may provide the desired flexibility for a next generation NodeB (gNB) to properly set the ALs for WUS transmission based on the geometry of grouped UEs to balance between performance and overhead.

According to one or more embodiments, a UE may be configured with a set of SSs or CORESETs with different transmission configuration indication (TCI) states indicating quasi-co-location information of the demodulation reference signal (DMRS) antenna port for the WUS PDCCH reception in a respective CORESET. In some examples, the different SSs with different TCI states may be located in a number of consecutive symbols within one or two consecutive slots.

Figure 2:
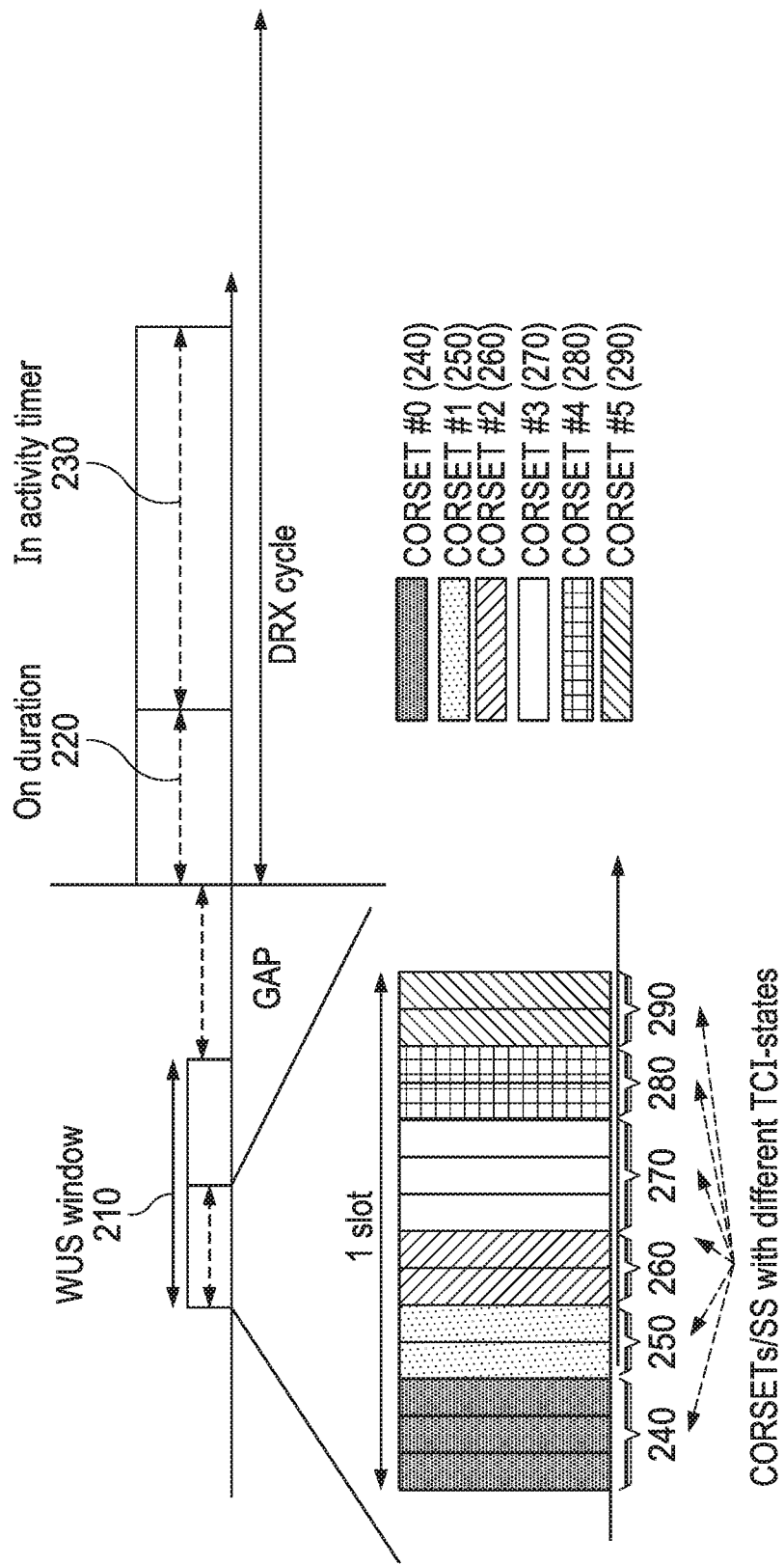
FIG. 2 illustrates an example of multiple CORESETs/SS configurations for WUS monitoring, according to some implementations of the present disclosure.

FIG. 2 illustrates an example of multiple CORESETs/SS configurations for WUS monitoring, according to some implementations. In particular, FIG. 2 illustrates time division multiplexed (TDMed) SSs with different TCI states for WUS monitoring. Referring to FIG. 2, a WUS window 210 may be semi-statically configured by higher layers with an offset or GAP before an on duration period 220 for every DRX cycle. Every WUS window may include a set of CORSETs 240-290 with different TCI states for WUS transmission in a TDM manner using different transmission (Tx) beams. This configuration may be applied for WUS monitoring on Frequency Range 2 (FR2) to enable a beam sweeping operation to ensure the robustness of WUS transmission.

III. DCI Content

The wake up DCI (WUS) may be used for the transmission of a group of power saving related adaptation commands for one or more UEs, including but not limited to wake up information. Disclosed are DCI formats for this wake up PDCCH.

FIG. 3 illustrates an example of the wake up DCI structure, according to some implementations. In an embodiment, and as illustrated in FIG. 3, the following information is transmitted by means of the wake up DCI with a cyclic redundancy check (CRC) scrambled by a new radio network temporary identifier (RNTI) defined for the wake up DCI: block number 0 and block number 1 through block number G. The starting position of a block may be determined by the starting position indicated by higher layers for the UE configured with the block. Further, G is a maximum number of UEs configured for monitoring the same wake up DCI. Some of the fields of block l (with $l \in \{1, \ldots, L\}$ fields) apply to all CCs configured for the UE, while some of the fields apply only to a subset of CCs configured for the UE.

In an embodiment, block number 0 defines common indication information that can be shared among UEs configured to monitor this wake up DCI. Block number 1 through block number G define the information for UE specific fields, where each block corresponds to a respective UE configured to monitor this wake up DCI. The mapping of block numbers to UEs (that is, which block number corresponds to which UE) may be configured by higher layers (e.g., via the indication of the starting position). In another embodiment, a block for common indication information for all UEs configured to monitor this wake up DCI can be block number G (e.g., the last block of the DCI) while the block numbers 0 through G−1 correspond to the UE specific fields for G UEs.

In an embodiment, if a UE has Nc CCs configured, one UE-specific block may be configured for the UE by higher layers, with at least one of the following fields defined for the block.

A first field is wake up indication. In one implementation, this field includes 1 bit. In this field, a value 1 instructs the UE to wake up in all configured CCs, and a value 0 instructs the UE to skip PDCCH monitoring in all configured CCs. In another example, the value 1 instructs the UE to wake up only on the PCell without monitoring PDCCH on the SCell until the UE detects the first valid DL assignment or UL grant on the PCell during a DRX active time period. In this example, value 1 instructs the UE to wake up for a certain number of DRX cycles that can be configured by higher layer signaling, or that can be configured by the wake up duration field in the wake up DCI (if it exists). In yet another example, value 0 indicates that the UE can skip the PDCCH monitoring for the next DRX cycle. Alternatively, it may indicate that the UE can skip the PDCCH monitoring for a certain number of DRX cycles that can be configured by higher layer signaling, or that can be configured by a wake up duration field in the wake up DCI (if it exists).

In another embodiment, no wake up PDCCH may be transmitted when the UE can skip the PDCCH monitoring of DRX cycle(s). It should be noted that it was assumed that a DMRS of WUS PDCCH may be used for detection of the presence of the WUS signal, and therefore, the discontinuous transmission (DTX) of the WUS is not hard encoded in the WUS DCI using one of multiple code states. Alternatively, the wake up indication field has Nc bits corresponding to a set of Nc CC groups. This may be a bitmap where value 1 of the $k^{th}$ bit instructs the UE to wake up in the configured $k^{th}$ CC group, and value 0 of the $k^{th}$ bit indicates to the UE to skip PDCCH monitoring in the configured $k^{th}$ CC group. Similar to the previous embodiment, the wake up and/or skipping indication can be applied for a certain number of a DRX cycles that can be configured by higher layer signaling, or that can be configured by a wake up duration field in the wake up DCI (if it exists). Alternatively, the skipping indication applies only to one DRX cycle. In cases where no CC group is to be woken up, no wake up PDCCH may be transmitted. The DMRS of the wake up PDCCH may be used for the wake up PDCCH presence detection.

In yet another embodiment, an N-bit wake up indication field may be included in a block of the WUS DCI format. Correspondingly, a set of CCs may be triggered to wake up for the associated DRX cycles, perhaps according to the value in Table 1 for PDCCH monitoring used for data scheduling during the DRX active period.

TABLE 1

| Wake up indication field for WUS operation in CA case | |
|---|---|
| Value of wake up indication field | Description |
| 0 | Wake up operation is triggered for a $1^{st}$ set of serving cells configured by higher layers |
| 1 | Wake up operation is triggered for a $2^{nd}$ set of serving cells configured by higher layers |
| . . . | . . . . . . |
| $2^N - 1$ | Wake up operation is triggered for a $2^N$ set of serving cells configured by higher layers |

Similar to the previous embodiment, in cases with no CCs to be woken up, the DMRS of the WUS PDCCH may be used for detection of the presence of the WUS signal, and therefore, the DTX of the WUS is not hard encoded in the WUS DCI using one of multiple code states. In some other examples, the code state of "0" in Table 1 may be used to indicate the DTX of the WUS signal for all CCs if the DMRS of the WUS PDCCH cannot be used to indicate the DTX WUS.

A second field is a Bandwidth part (BWP) indicator. In one embodiment, this field has 0, 1, or 2 bits as determined by the number of DL BWPs $n_{BWP,RRC}$ configured by higher layers, excluding the initial DL bandwidth part. The bit width for this field is determined as $\lceil \log_2(n_{BWP}) \rceil$ bits, where $n_{BWP,RRC}+1$ if $n_{BWP,RRC} \leq$ in 3. In this case, the bandwidth part indicator is equivalent to the higher layer parameter BWP-Id. Otherwise, $n_{BWP}=n_{BWP,RRC}$, in which case the bandwidth part indicator is defined in Table 7.3.1.1.2-1 of 3GPP TS 38.212.

For UEs configured with multiple CCs, $n_{BWP,RRC}$ may be the maximum number of bandwidth parts configured by higher layers on these CCs. Alternatively, the UE may not be expected to be configured with different $n_{BWP,RRC}$ on these CCs. The latter option may result in limited flexibility in the configuration.

In another embodiment, this field has number of bits being determined by the number of DL BWPs $n_{BWP,RRC}$ configured by higher layers for each CC group, excluding the initial DL bandwidth part. The bitwidth for this field is determined as $\lceil \log_2(\Sigma_{i=1}^{N_c} n_{BWP,i}) \rceil$ bits, where $n_{BWP,i}$ may be calculated as described above for the $i^{th}$ CC group, and where the parameter $n_{BWP,RRC}$ may be the maximum number of bandwidth parts configured by higher layers on these CCs belong to the $i^{th}$ CC group. Alternatively, the UE may not be expected to be configured with different $n_{BWP,RRC}$ on these CCs belong to the $i^{th}$ CC group. The latter option may result in limited flexibility in the configuration.

In yet another embodiment, this field has M bits. The UE may be triggering to switch to the corresponding BWPs on the associated CCs, perhaps according to a value in Table 2. The BWP indictor field may indicate a set of paired <active DL BWP, active CC>, from the configured DL BWP set, for DL reception.

TABLE 2

BWP indicator field for WUS operation in the CA case

| Value of wake up indication field | Description |
|---|---|
| 0 | Switching to or active the first set of pairs of ⟨$BWP_i$, $CC_k$⟩ configured by higher layers |
| 1 | Switching to or active the second set of pairs of ⟨$BWP_i$, $CC_k$⟩ configured by higher layers |
| ... | ...... |
| $2^M - 1$ | Switching to or active the $2^M$th set of pairs of ⟨$BWP_i$, $CC_k$⟩ configured by higher layers |

Figure 4:
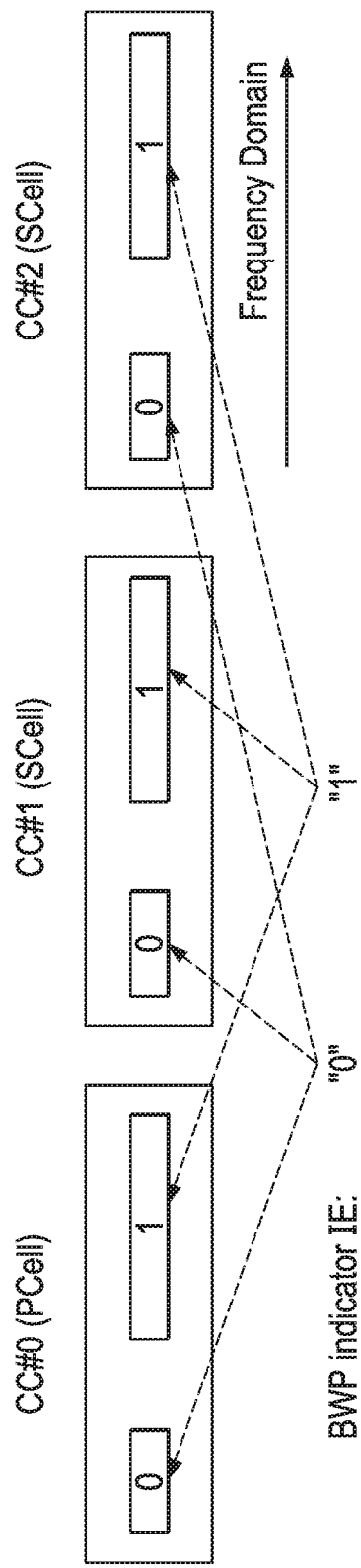
FIG. 4 illustrates an example of group-based BWP switching in the case of CA, according to some implementations of the present disclosure.

FIG. 4 illustrates an example of group-based BWP switching in the case of CA, according to some implementations. The following BWP/CCs groups may be configured by RRC to associate with a different value of a 1-bit BWP indictor:

"0": ⟨$BWP_i$, $CC_k$⟩, $i = 0, k = 0, 1, 2$

"1": ⟨$BWP_i$, $CC_k$⟩, $i = 1, k = 0, 1, 2$

Correspondingly, the UE switches to the associated BWPs on the associated CCs based on the detected value of BWP indictor IE in WUS DCI. As one example, the UE starts monitoring PDCCH on the BWP 0 in each CC if "0" is set in the BWP ID IE.

In an embodiment, a UE may stop PDCCH monitoring on either all SCells or a subset of SCells (e.g., as configured by higher layers) when it switches to a first BWP on PCell (e.g., either by 3GPP Release 15 (Rel-15) DCI or by BWP timer defined for BWP switching) or when it switches to a first SS on the first BWP on the PCell (e.g., SS with longest PDCCH monitoring periodicity). In some other examples, a UE may continue to monitor a second SS on a second BWP on the SCells after it switches to the first BWP, or to the first SS on the first BWP on the PCell. More specifically, the first BWP on the PCell and the second BWP on the SCell may be the Rel-15 initial BWP (or default BWP), or may be the BWP with the smallest bandwidth (BW) among the configured BWPs on the respective CC or explicitly configured by higher layers on a per CC basis. The first SS on the PCell and the second SS on the SCell may be either explicitly configured by RRC on a per CC basis, or may be the SS with the longest PDCCH monitoring periodicity. For both solutions, the UE continues monitoring the PDCCH on the PCell as usual.

A fourth field may be an A-CSI triggering and channel state information reference signal (CSI-RS) transmission. This field may be 0, 1, 2, 3, 4, 5, or 6 bits as determined by a higher layer parameter reportTriggerSize. For UEs configured with multiple CCs, the number of bits can be determined as the maximum number of bits configured by the higher layer parameter reportTriggerSize on the configured CCs. Alternatively, this field has $\Sigma_{i=1}^{N_c} n_{CSI,i}$ bits where $n_{CSI,i}$ may be the maximum number of bits determined by higher layer parameter reportTriggerSize on the CCs belonging to $i^{th}$ CC group.

In an embodiment, this field may be used to trigger CSI report on the CCs to be woken up. Here, the UE may not be expected to be triggered with a CSI report on the CCs that are not woken up by the wake up DCI. In some examples, A-CSI triggering is supported by wake up PDCCH and PUSCH is supported to carry the CSI report, resource allocation, MCS, RV and/or HARQ process for the PUSCH transmission. Note that in some embodiments, some of these parameters can be configured by higher layer signaling, while the remainder of these parameters may be indicated by the wake up DCI. The resource allocation, MCS, RV and/or HARQ process may be different for different CCs belong to the CC group(s) to be woken up. This configuration may result in large overhead. The indication for resource allocation, MCS, RV, and/or HARQ process for the CCs that are not woken up can be ignored by the UE. Alternatively, the same resource allocation, MCS, RV, and/or HARQ process can be used for all CCs belonging to the CC group(s) to be woken up.

In an embodiment, a resource allocation, MCS, RV, and/or HARQ process indication can follow Rel-15 UL grant indication (e.g., DCI format 0_0 or 0_1). Alternatively, a set of the resource allocation, MCS, RV, and/or HARQ process can be configured by higher layer signaling, and the wake up DCI indicates the index corresponding to one configuration of resource allocation, MCS, RV, and/or HARQ process.

In an embodiment, if A-CSI triggering is supported by the wake up PDCCH and the PUCCH is supported to carry the CSI report, resource allocation and/or TPC command can be indicated by the wake up PDCCH. As a part of the resource allocation, for the time-domain resource assignment, a parameter defining the timing gap between the DCI and the PUCCH carrying CSI report can be introduced. Similar to the PDSCH-to-HARQ_feedback timing indicator, a set of possible values can be configured by higher layer signaling, and the wake up DCI can indicate the value to be used. For example, 3 bits can be used if the timing is shared among all CCs, or 3*Nc can be used (with Nc being the number of CCs) if different timing is used for different CCs. Alternatively, this DCI field can include the indication of the timing gap between DCI and the PUCCH carrying CSI report directly. In the latter configuration, more bits may be needed compared to the former configuration where the set of candidate values for the timing gap is configured by higher layer signaling.

In an embodiment, if the UE is configured with multiple CCs, then the resource allocation and/or TPC command can be different for the CCs belonging to the CC group(s) to be woken up. Alternatively, the same resource allocation and/or TPC command is used for the CCs belonging to the CC group(s) to be woken up. A set of the resource allocations can be configured by higher layer signaling, and wake up DCI indicates the index corresponding to one configuration of resource allocation.

A fourth field is wake up duration. In one embodiment, the wake up duration can be indicated by the wake up DCI, which can be in units of DRX cycles. For example, the number of DRX cycles associated with the wake up duration can be ND, where ND can be predefined in the spec or configured by RRC signaling. The number of bits in this field may be $\lceil \log_2(N_D) \rceil$.

In cases where the wake up PDCCH can be received during the DRX on-duration, the wake up PDCCH may indicate that the UE needs to wake up for the next N DRX cycle(s). Alternatively, the wake up PDCCH may indicate that the UE needs to wake up for the next N−1 DRX cycle(s), taking the current DRX cycle into account. In another embodiment, a length W bitmap may be used to indicate the wake up status of the next W DRX cycles. This indication is common for all the CC group(s) to be woken up. In yet another embodiment, a length $W*N_c$ bitmap may be used to indicate the wake up status of the next W DRX cycles, where $N_c$ denotes the number of CC group(s) configured for the UE. This field indicates the wake up status of next W DRX cycles for CCs in each CC group independently.

A fifth field is cross-slot configuration. In one embodiment, this field has 1 bit. In this embodiment, a value of "1" indicates, commonly for all the CCs or some selected CCs that are up by WUS, to potentially use the rows in the Time Domain Resource Allocation (TDRA) tables configured by a higher layer, with $k_0>0$ for PDSCH scheduling and $k_2>0$ for PUSCH scheduling (e.g., cross-slot scheduling). The value of "0" indicates to use all the rows in TDRA tables configured by a higher layer without restriction. In other words, a subset of the rows in the TDRA tables configured by higher layer signaling may be selected when the value of this field is "1."

In another embodiment, this field has 2 bits for indication of $K_0$. For UEs configured with multiple CCs, this indication applies to all CCs belonging to the CC group(s) to be woken up. Alternatively, this indication applies to all CCs configured for the UEs, regardless of whether the CC is to be woken up or not. In yet another embodiment, multiple TDRA tables may be configured by higher layer signaling. Denoting the number of TDRA tables by Nt, this field may have $\lceil \log_2(Nt) \rceil$ bits to select one of the TDRA table to use.

In one example, the indication may be applied to all configured CCs. Alternatively, the indication may be applied only to the CCs to be woken up by this wake up PDCCH. In yet another example, denoting the number of bits in this field for the above embodiments by M, this field can be extended to be M*Nc bits, where Nc denotes the number of CCs (CC groups). In this example, each M bits are used for the indication of one CC (group) and the indication method follows the previously described embodiments.

In some other examples, the UE may switch back to a default scheduling scheme (e.g., either cross-slot scheduling or same-slot scheduling) after a corresponding timer expires, or if explicitly indicated by network using DCI. In the timer-based scheme, the duration of timer may be configured by RRC signaling on a per UE basis.

A sixth field is antenna adaptation. In an example, 1 bit can be used to indicate the number of antenna adaptation between 2Rx and 4Rx chains. In other examples, the antenna adaption field indicates the maximum MIMO layers used for PDSCH scheduling within a given wake up period for both PDCCH and PDSCH, or PDSCH reception only with keeping PDCCH for larger reception antennas.

In an embodiment, the block for common indication may be designed similar to the design of the block above. However, the block for common indication may make the following change. For all parameters configured by higher layers (e.g., number of bits for BWP configuration, number of bits for CSI triggering, number of bits for cross-slot configuration, etc.), the parameters should be updated to the maximum possible values. Alternatively, the field sizes may be indicated by higher layer signaling.

In an embodiment, for the design of CSI report (e.g., the timing relationship to perform the CST measurement and report CSI), the aperiodic CST-RS (A-CSI-RS) offset may be indicated as part of WUS DCI. The offset may be larger than the GAP value in FIG. 2 to ensure that the CSI-RS is transmitted in the active BWP at the start of on duration period. In some other examples, when aperiodic CSI-RS is triggered by PDCCH that schedules PUSCH, the offset value "X" of A-CSI-RS transmission may be determined based on the scheduling scheme. For example, X=0 in the case that same slot scheduling is used by a TDRA table. Otherwise, X=1 is used, such as when cross-slot scheduling is operated.

For the configurations by higher layer signaling and the adaptations indicated by wake up PDCCH, the UE may provide assistance information to optimize the configuration/adaptions.

If the wake up DCI is monitored in the search space shared with other DCI formats (e.g., DCI format 1_0 or 1_1), zeros may be appended until the payload size of the DCI format equal to the maximum payload size the other DCI formats monitored in the same search space.

Figure 5A:
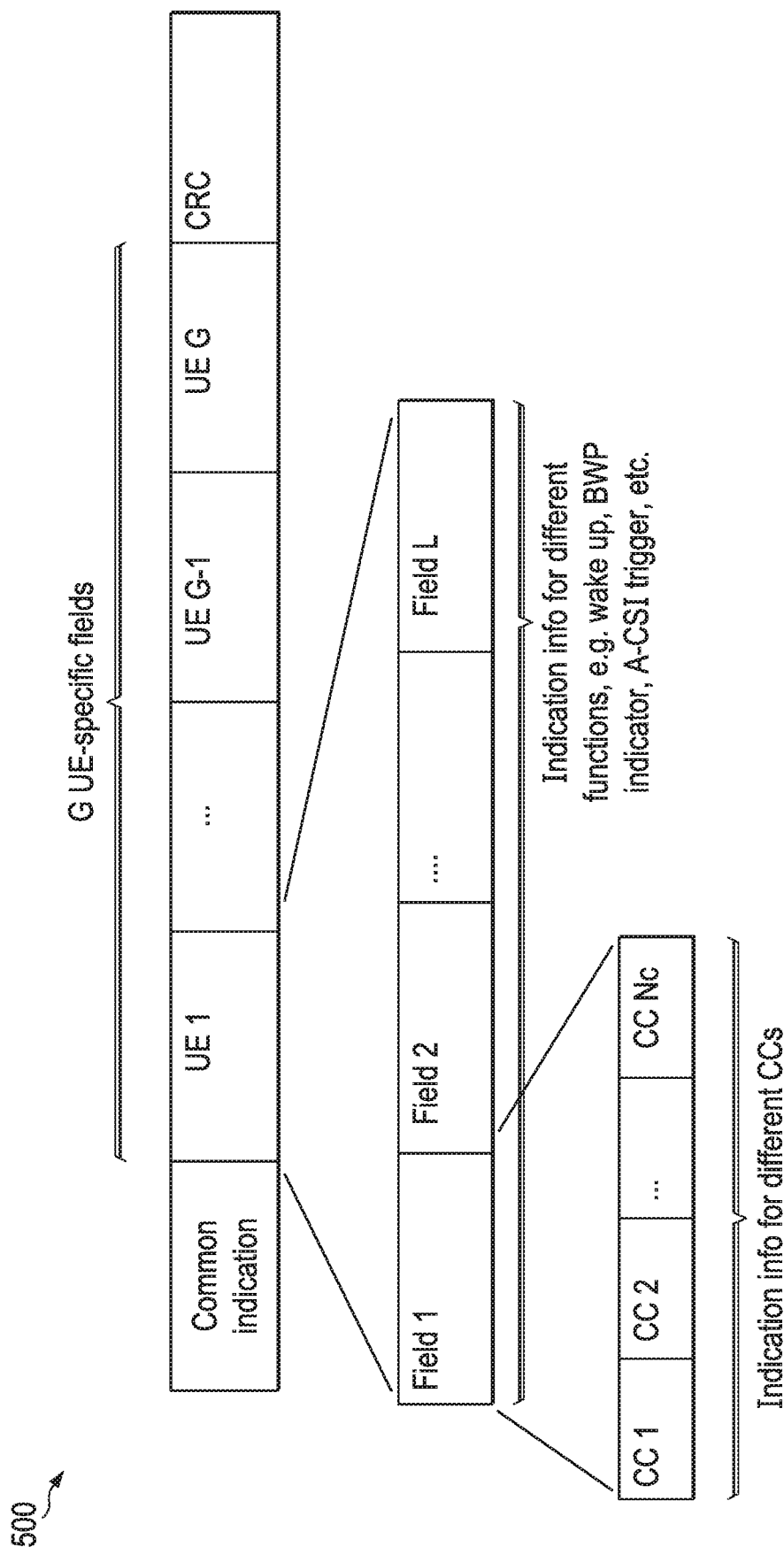
FIGS. 5A, 5B, and 5C illustrate examples of wake up DCI structures, according to some implementations of the present disclosure.
Figure 5B:
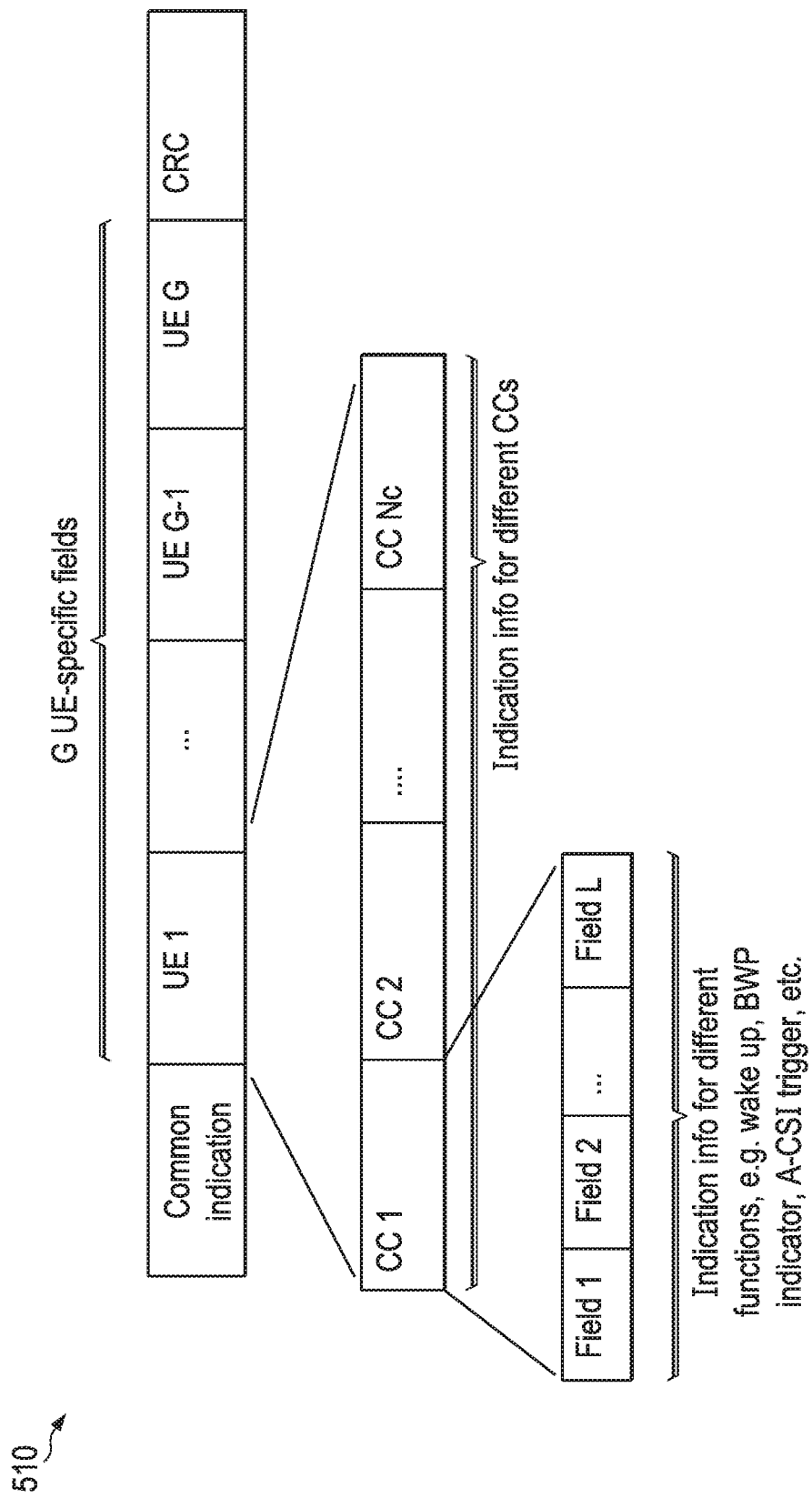

The previous description assumes the structure of the fields in the wake up PDCCH as illustrated in FIG. 5A, where the fields for each indication function are arranged first and the detailed indication information for different CC (groups) is contained in each of these fields. Alternatively, the fields can be separated by CC (group) first, and within each of the field for one CC (group), different indication information for different functions are contained, as illustrated in FIG. 5B. In yet another example, the structure of the fields can be first separated by the CC (group), and within each of these field, common indication block and UE-specific indication block are contained, as illustrated in FIG. 5C.

Figure 5C:
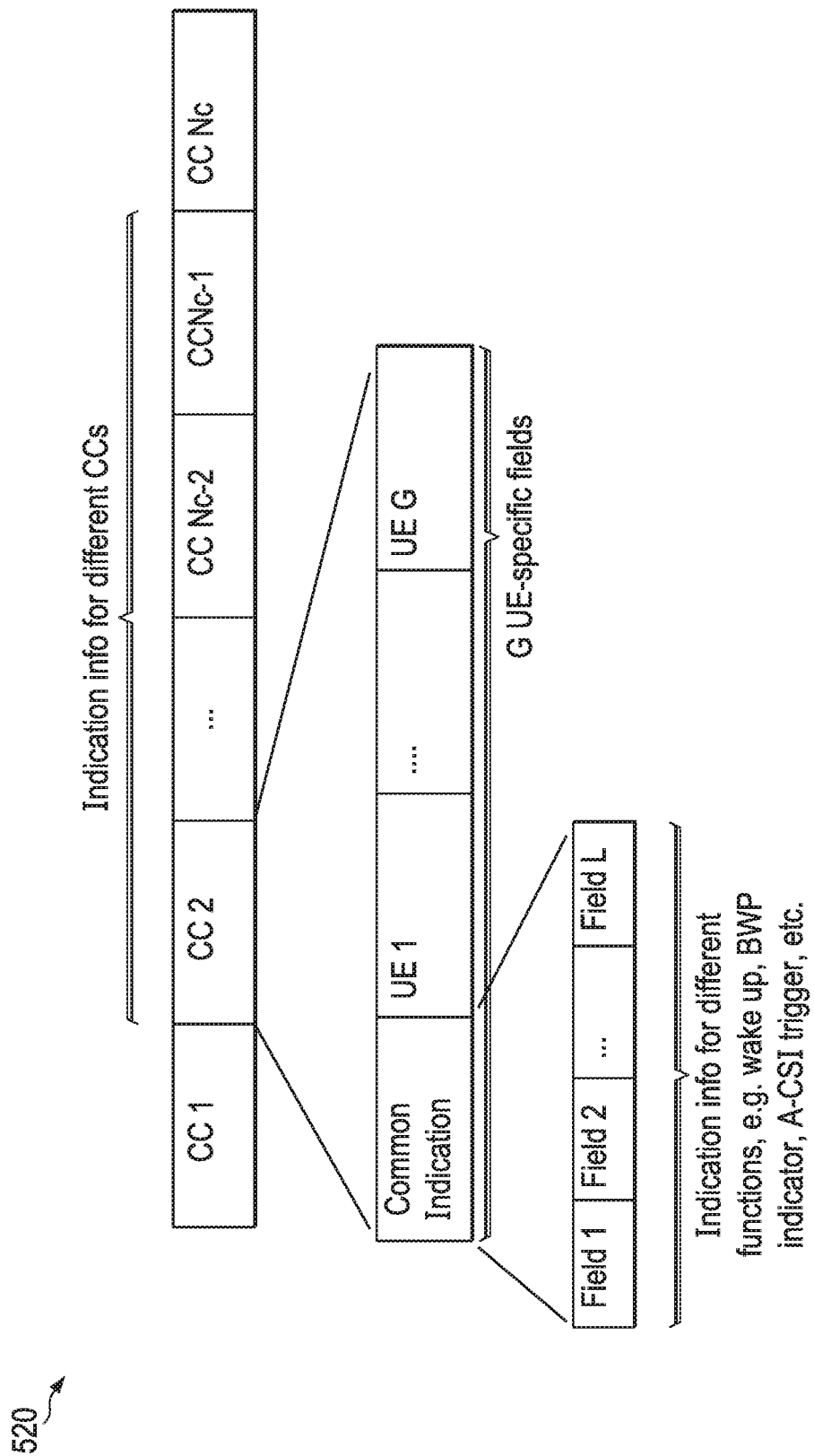

FIGS. 5A, 5B, 5C illustrate examples of wake up DCI structures, according to some implementations. FIG. 5A illustrates a DCI structure 500, where the DCI includes a common indication block and G UE-specific indication blocks, each of which includes several fields for different indication functions (e.g., wake up indicator, BWP indicator, A-CSI trigger, etc.). Each field for an indication function further includes the information for different CCs or CC groups, where the information can be shared among all configured CCs (groups) or different CCs (groups).

FIG. 5B illustrates another DCI structure 510. In this example, the DCI includes a common indication block and G UE-specific indication blocks, each of which includes indication information for different CC (group). Each field for a CC (group) further contains the indication information for that CC (group), including different fields for different indication functions (e.g., wake up indicator, BWP indicator, A-CSI trigger, etc.).

FIG. 5C illustrates another DCI structure 520. In this example, the DCI includes indication information for different CCs (group). For each CC (group), the indication information further includes a common indication block and G UE-specific indication block. Each of the indication block includes different fields for different indication functions (e.g., wake up indicator, BWP indicator, A-CSI trigger, etc.).

Figure 6A:
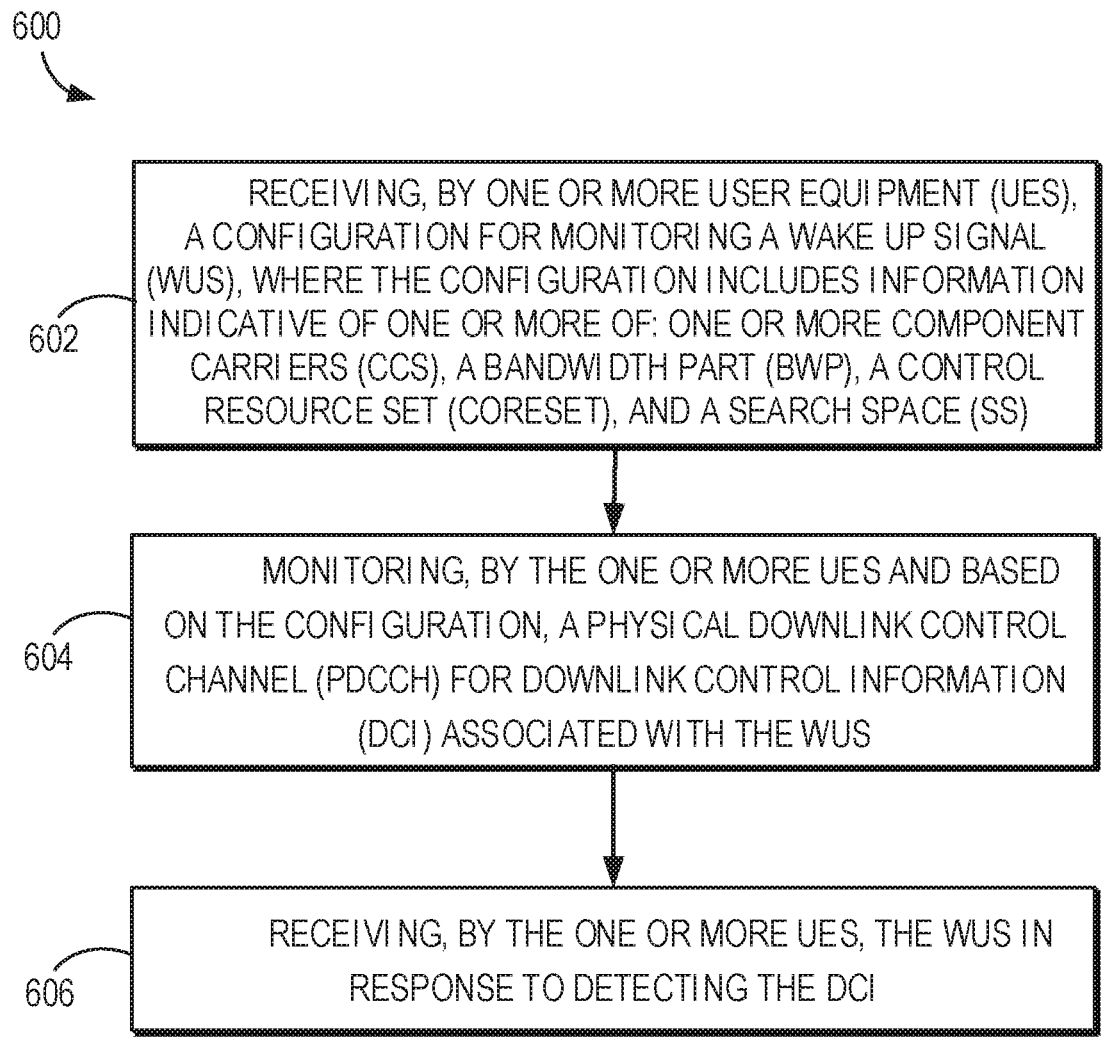
FIGS. 6A and 6B illustrates a flowchart of an example method, according to some implementations of the present disclosure.
Figure 6B:
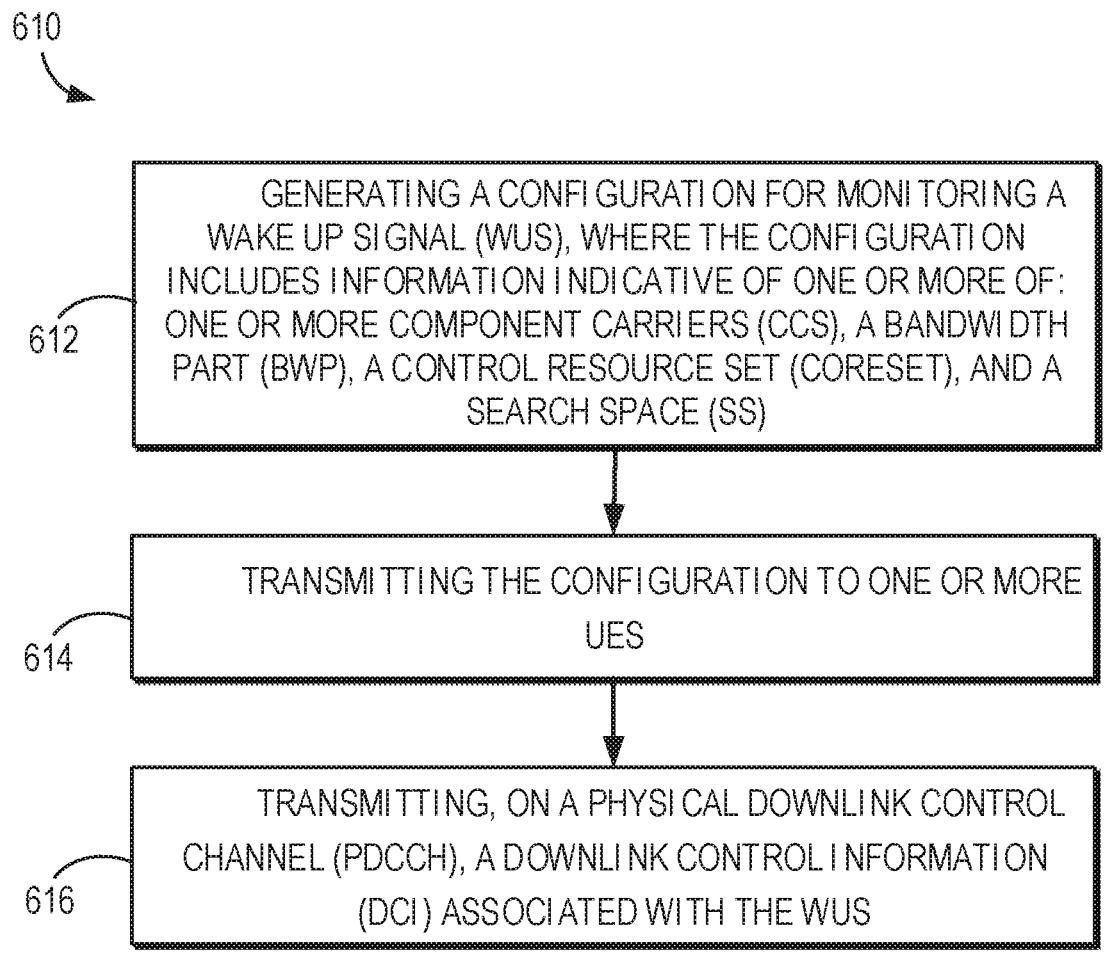

FIGS. 6A and 6B illustrate flowcharts of example processes, according to some implementations. For clarity of presentation, the description that follows generally describes the processes in the context of the other figures in this description. For example, process 600 can be performed by a UE (e.g., UE 101) shown in FIG. 7. As another example, process 610 can be performed by a RAN (e.g., RAN 710) shown in FIG. 7 or a network element thereof (e.g., node 711). However, it will be understood that the processes may be performed, for example, by any suitable system, environment, software, and hardware, or a combination of systems, environments, software, and hardware, as appropriate. In some implementations, various steps of the processes can be run in parallel, in combination, in loops, or in any order.

FIG. 6A is a flowchart of an example method 600 for receiving, by one or more UEs, a Physical Downlink Control Channel-based (PDCCH-based) wake-up signal. At step 602, the method involves receiving, by one or more user equipment (UEs), a configuration for monitoring a wake up signal (WUS), where the configuration includes information indicative of one or more of: one or more component carriers (CCs), a bandwidth part (BWP), a control resource set (CORESET), and a search space (SS). At step 604, the method involves monitoring, by the one or more UEs and based on the configuration, a physical downlink control channel (PDCCH) for downlink control information (DCI) associated with the WUS. At step 606, the method involves receiving, by the one or more UEs, the WUS in response to detecting the DCI.

In some implementations, the configuration further includes information indicative of one or more of: a starting position of a UE specific field block; a size of the UE specific field block; an information field; a plurality of component carriers (CCs) that share a radio frequency (RF) chain, where the plurality of component carriers comprise a primary cell (PCell) and a secondary cell (SCell); a number of discontinuous reception (DRX) cycles; a resource allocation for a physical uplink control channel (PUCCH), a physical uplink shared channel (PUSCH), a modulation and coding scheme (MCS), a redundancy version (RV), or a hybrid acknowledge request (HARQ) process for the PUSCH; a transmit power control (TPC) command for the PUCCH, the PUSCH, the MCS, the RV, or the HARQ process for the PUSCH; a field size of a common field; a pair of a BWP and CC; a timer indicating a duration after which the UE should revert to a default scheduling scheme; and one or more time domain resource allocation (TDRA) tables.

In some implementations, the DCI includes an indication of one or more of: a wake up duration for the one or more UEs; a wake up duration, a BWP associated with one or more CCs, aperiodic channel state information (A-CSI) for triggering CSI associated with one or more CCs, a resource allocation, a transmit power control (TPC) command, a modulation and coding scheme (MCS), a redundancy version (RV), a hybrid acknowledge request (HARQ) process for a physical uplink shared channel (PUSCH), or an antenna adaptation. In some implementations, the monitoring is performed when the one or more UEs are operating in a discontinuous reception off (DRX-OFF) state. In some implementations, monitoring the PDCCH for the DCI associated with the WUS is prioritized over monitoring the PDCCH for other types of DCI.

In some implementations, the one or more UE includes a plurality of UEs, and where the WUS includes at least one of: (i) information that applies to each UE of the plurality of UEs, or (ii) information that is specific to one UE of the plurality of UEs. In some implementations, the WUS is specific to the one or more UEs. In some implementations, the WUS is enabled or disabled by higher layer signaling, where the higher layer signaling includes cell-specific signaling or UE-specific signaling. In some implementations, the PDCCH shares a common search space (CSS) with an existing DCI format. In some implementations, a search space (SS) for the PDCCH is configured by high layer signaling, where a configuration includes at least one of: periodicity, offset, duration, control resource set (CORESET) identifier (ID), search space (SS) ID, transmission configuration indication (TCI) state, common search space (CSS) flag, or aggregation levels (ALs). In some implementations, the one or more UEs monitor the wake up DCI during a DRX-off period. In some implementations, monitoring of the DCI is prioritized.

In some implementations, the method further including: a set of search spaces (SSs) or control resource sets (CORESETs) with different transmission configuration indication (TCI) states is configured, and where the different SSs or CORESETs with different TCI states are located in a number of consecutive symbols within one or two consecutive slots of WUS monitoring window. In some implementations, a DCI payload includes: (i) a common indication block that applies to all of the one or more UEs, or (ii) a UE-specific information block that applies to one UE of the one or more UEs. In some implementations, the DCI includes a common indication block and a plurality of UE-specific indication blocks, where the UE-specific indication blocks include a plurality of fields including indication functions, where the plurality of fields each include information for different CCs or CC groups, and where the information is shared among the different CCs or CC groups.

In some implementations, the DCI includes a common indication block and a plurality of UE-specific indication blocks, where the UE-specific indication blocks each include indication information for different CCs, and where each field for a CC further includes indication information for that CC. In some implementations, the DCI includes indication information for different CCs, where, for each CC, the indication information further includes a common indication block and a plurality of UE-specific indication blocks. In some implementations, the DCI includes a wake up indication that indicates whether a UE should wake up for next N DRX cycles, where N is a predetermined number or is indicated by the DCI. In some implementations, the configuration further includes pairs of BWP and CC groups is to be activated by the WUS.

In some implementations, the one or more component carriers (CCs) are a plurality of CCs that comprise a primary cell and secondary cells, where a UE stops PDCCH monitoring on either all secondary cells (SCells) or a subset of SCells when it is switched to a first BWP on a primary cell (PCell) or when it is switched to a first search space (SS) on the first BWP on the PCell. In some implementations, the DCI further includes an aperiodic channel state information (A-CSI) trigger that triggers a channel state information (CSI) report on component carriers (CCs) to be woken up by the WUS. In some implementations, the channel state information (CSI) report is carried in a physical uplink shared channel (PUSCH).

In some implementations, the DCI includes a wake up duration in units of discontinuous reception (DRX) cycles. In some implementations, the DCI includes an antenna adaptation, where the antenna adaptation is indicative of at least one of: a number of receiving (Rx) antenna chains between 2 and 4 or a maximum number of multiple-input and multiple-output (MIMO) layers used for a physical downlink shared channel (PDSCH) scheduling within a given wake up period for both a physical downlink control channel (PDCCH) and the PDSCH.

FIG. 6B is a flowchart of an example method 610 for generating, by a radio access network (RAN), a Physical Downlink Control Channel-based (PDCCH-based) wake-up signal. At step 612, the method involves generating a configuration for monitoring a wake up signal (WUS), where the configuration includes information indicative of one or more of: one or more component carriers (CCs), a bandwidth part (BWP), a control resource set (CORESET), and a search space (SS). At step 614, the method further includes transmitting the configuration to one or more UEs. At step 616, the method also includes transmitting, on a physical downlink control channel (PDCCH), a downlink control information (DCI) associated with the WUS.

The example process shown in FIGS. 6A and 6B can be modified or reconfigured to include additional, fewer, or different steps (not shown in FIGS. 6A and 6B), which can be performed in the order shown or in a different order.

Figure 7:
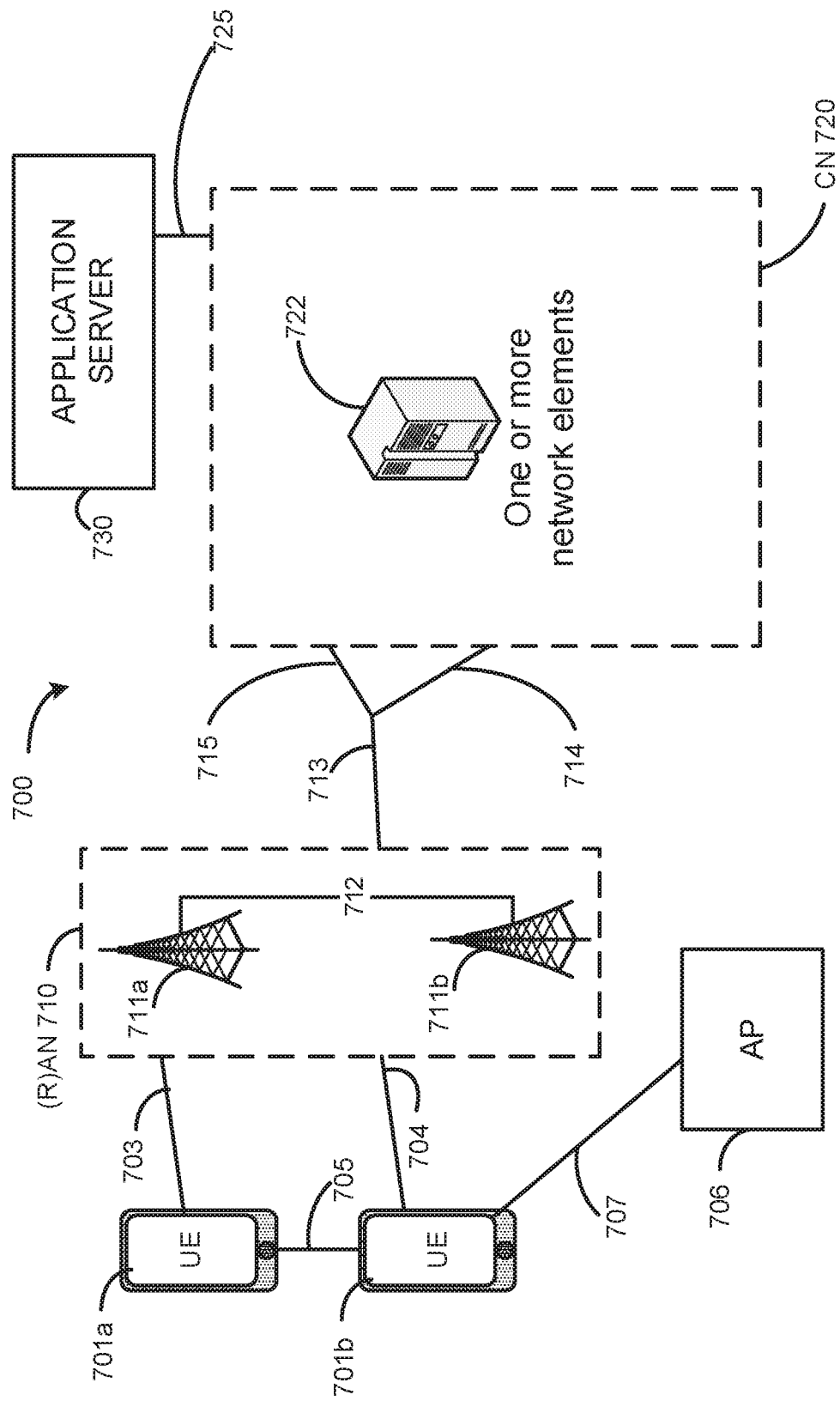
FIG. 7 illustrates an example architecture of a system 700 of a network, according to some implementations of the present disclosure.

FIG. 7 illustrates an example architecture of a system 700 of a network, in accordance with various embodiments. The following description is provided for an example system 700 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 7, the system 700 includes UE 701a and UE 701b (collectively referred to as "UEs 701" or "UE 701"). In this example, UEs 701 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 701 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 may be configured to connect, for example, communicatively couple, with an or RAN 710. In embodiments, the RAN 710 may be an NG RAN or a 5G RAN, an E-UTRAN, or a legacy RAN, such as a UTRAN or GERAN. As used herein, the term "NG RAN" or the like may refer to a RAN 710 that operates in an NR or 5G system 700, and the term "E-UTRAN" or the like may refer to a RAN 710 that operates in an LTE or 4G system 700. The UEs 701 utilize connections (or channels) 703 and 704, respectively, each of which comprises a physical communications interface or layer (discussed in further detail below).

In this example, the connections 703 and 704 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 701 may directly exchange communication data via a ProSe interface 705. The ProSe interface 705 may alternatively be referred to as a SL interface 705 and may comprise one or more logical channels, including but not limited to a PSCCH, a PSSCH, a PSDCH, and a PSBCH.

The UE 701b is shown to be configured to access an AP 706 (also referred to as "WLAN node 706," "WLAN 706," "WLAN Termination 706," "WT 706" or the like) via connection 707. The connection 707 can comprise a local wireless connection, such as a connection consistent with any IEEE 802.11 protocol, wherein the AP 706 would comprise a wireless fidelity (Wi-Fi®) router. In this example, the AP 706 is shown to be connected to the Internet without connecting to the core network of the wireless system (described in further detail below). In various embodiments, the UE 701b, RAN 710, and AP 706 may be configured to utilize LWA operation and/or LWIP operation. The LWA operation may involve the UE 701b in RRC_CONNECTED being configured by a RAN node 711a-b to utilize radio resources of LTE and WLAN. LWIP operation may involve the UE 701b using WLAN radio resources (e.g., connection 707) via IPsec protocol tunneling to authenticate and encrypt packets (e.g., IP packets) sent over the connection 707. IPsec tunneling may include encapsulating the entirety of original IP packets and adding a new packet header, thereby protecting the original header of the IP packets.

The RAN 710 can include one or more AN nodes or RAN nodes 711a and 711b (collectively referred to as "RAN nodes 711" or "RAN node 711") that enable the connections 703 and 704. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 711 that operates in an NR or 5G system 700 (for example, a gNB), and the term "E-UTRAN node" or the like may refer to a RAN node 711 that operates in an LTE or 4G system 700 (e.g., an eNB). According to various embodiments, the RAN nodes 711 may be implemented as one or more of a dedicated physical device such as a macrocell base station, and/or a low power (LP) base station for providing femto-cells, picocells or other like cells having smaller coverage areas, smaller user capacity, or higher bandwidth compared to macrocells.

In some embodiments, all or parts of the RAN nodes 711 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 711; a MAC/PHY split wherein RRC, PDCP, RLC, and MAC layers are operated by the CRAN/vBBUP and the PHY layer is operated by individual RAN nodes 711; or a "lower PHY" split wherein RRC, PDCP, RLC, MAC layers and upper portions of the PHY layer are operated by the CRAN/vBBUP and lower portions of the PHY layer are operated by individual RAN nodes 711. This virtualized framework allows the freed-up processor cores of the RAN nodes 711 to perform other virtualized applications. In some implementations, an individual RAN node 711 may represent individual gNB-DUs that are connected to a gNB-CU via individual F1 interfaces (not shown by FIG. 7). In these implementations, the gNB-DUs may include one or more remote radio heads or RFEMs (see, e.g., FIG. 10), and the gNB-CU may be operated by a server that is located in the RAN 710 (not shown) or by a server pool in a similar manner as the CRAN/vBBUP. Additionally or alternatively, one or more of the RAN nodes 711 may be next generation eNBs (ng-eNBs), which are RAN nodes that provide E-UTRA user plane and control plane protocol terminations toward the UEs 701, and are connected to a 5GC (e.g., CN 920 of FIG. 9) via an NG interface (discussed infra).

In V2X scenarios one or more of the RAN nodes 711 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 701 (vUEs 701). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 711 can terminate the air interface protocol and can be the first point of contact for the UEs 701. In some embodiments, any of the RAN nodes 711 can fulfill various logical functions for the RAN 710 including, but not limited to, radio network controller (RNC) functions such as radio bearer management, uplink and downlink dynamic radio resource management and data packet scheduling, and mobility management.

In embodiments, the UEs 701 can be configured to communicate using OFDM communication signals with each other or with any of the RAN nodes 711 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 to the UEs 701, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 701 and the RAN nodes 711 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 701 and the RAN nodes 711 may operate using LAA, eLAA, and/or feLAA mechanisms. In these implementations, the UEs 701 and the RAN nodes 711 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 701 RAN nodes 711, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 701, AP 706, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (?s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 701 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 701. The PDCCH carries information about the transport format and resource allocations related to the PDSCH channel, among other things. It may also inform the UEs 701 about the transport format, resource allocation, and HARQ information related to the uplink shared channel. Typically, downlink scheduling (assigning control and shared channel resource blocks to the UE 701*b* within a cell) may be performed at any of the RAN nodes 711 based on channel quality information fed back from any of the UEs 701. The downlink resource assignment information may be sent on the PDCCH used for (e.g., assigned to) each of the UEs 701.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 711 may be configured to communicate with one another via interface 712. In embodiments where the system 700 is an LTE system (e.g., when CN 720 is an EPC 820 as in FIG. 8), the interface 712 may be an X2 interface 712. The X2 interface may be defined between two or more RAN nodes 711 (e.g., two or more eNBs and the like) that connect to EPC 720, and/or between two eNBs connecting to EPC 720. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 701 from an SeNB for user data; information of PDCP PDUs that were not delivered to a UE 701; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 700 is a 5G or NR system (e.g., when CN 720 is an 5GC 920 as in FIG. 9), the interface 712 may be an Xn interface 712. The Xn interface is defined between two or more RAN nodes 711 (e.g., two or more gNBs and the like) that connect to 5GC 720, between a RAN node 711 (e.g., a gNB) connecting to 5GC 720 and an eNB, and/or between two eNBs connecting to 5GC 720. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 701 in a connected mode (e.g., CM-CONNECTED) including functionality to manage the UE mobility for connected mode between one or more RAN nodes 711. The mobility support may include context transfer from an old (source) serving RAN node 711 to new (target) serving RAN node 711; and control of user plane tunnels between old (source) serving RAN node 711 to new (target) serving RAN node 711. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 710 is shown to be communicatively coupled to a core network-in this embodiment, core network (CN) 720. The CN 720 may comprise a plurality of network elements 722, which are configured to offer various data and telecommunications services to customers/subscribers (e.g., users of UEs 701) who are connected to the CN 720 via the RAN 710. The components of the CN 720 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 720 may be referred to as a network slice, and a logical instantiation of a portion of the CN 720 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 730 may be an element offering applications that use IP bearer resources with the core network (e.g., UMTS PS domain, LTE PS data services, etc.). The application server 730 can also be configured to support one or more communication services (e.g., VoIP sessions, PTT sessions, group communication sessions, social networking services, etc.) for the UEs 701 via the EPC 720.

In embodiments, the CN 720 may be a 5GC (referred to as "5GC 720" or the like), and the RAN 710 may be connected with the CN 720 via an NG interface 713. In embodiments, the NG interface 713 may be split into two parts, an NG user plane (NG-U) interface 714, which carries traffic data between the RAN nodes 711 and a UPF, and the S1 control plane (NG-C) interface 715, which is a signaling interface between the RAN nodes 711 and AMFs. Embodiments where the CN 720 is a 5GC 720 are discussed in more detail with regard to FIG. 9.

In embodiments, the CN 720 may be a 5G CN (referred to as "5GC 720" or the like), while in other embodiments, the CN 720 may be an EPC). Where CN 720 is an EPC (referred to as "EPC 720" or the like), the RAN 710 may be connected with the CN 720 via an S1 interface 713. In embodiments, the S1 interface 713 may be split into two parts, an S1 user plane (S1-U) interface 714, which carries traffic data between the RAN nodes 711 and the S-GW, and the S1-MME interface 715, which is a signaling interface between the RAN nodes 711 and MMEs.

Figure 8:
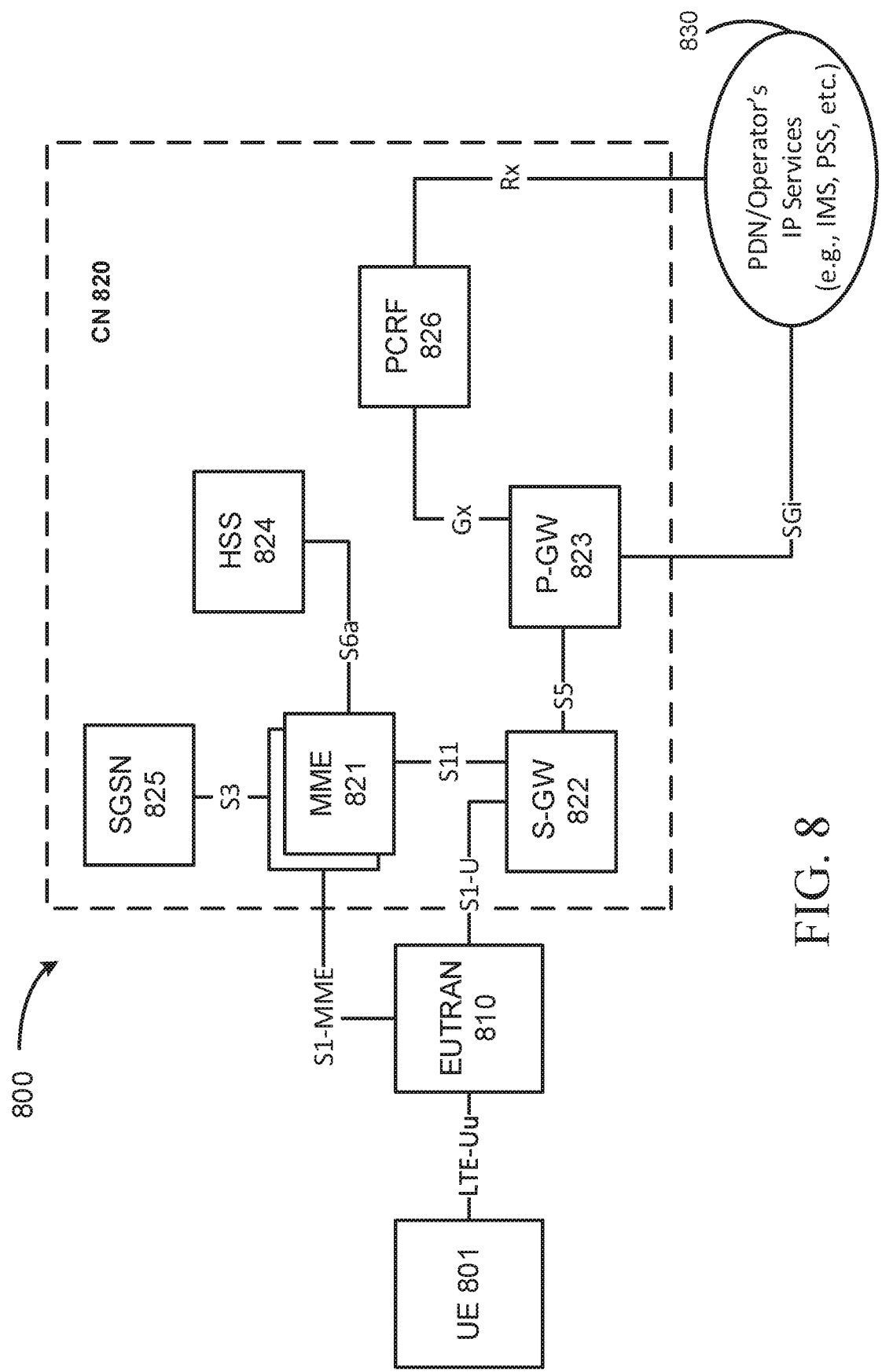
FIG. 8 illustrates an example architecture of a system including a core network, according to some implementations of the present disclosure.

FIG. 8 illustrates an example architecture of a system 800 including a first CN 820, in accordance with various embodiments. In this example, system 800 may implement the LTE standard wherein the CN 820 is an EPC 820 that corresponds with CN 720 of FIG. 7. Additionally, the UE 801 may be the same or similar as the UEs 701 of FIG. 7, and the E-UTRAN 810 may be a RAN that is the same or similar to the RAN 710 of FIG. 7, and which may include RAN nodes 711 discussed previously. The CN 820 may comprise MMEs 821, an S-GW 822, a P-GW 823, a HSS 824, and a SGSN 825.

The MMEs 821 may be similar in function to the control plane of legacy SGSN, and may implement MM functions to keep track of the current location of a UE 801. The MMEs 821 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 801, provide user identity confidentiality, and/or perform other like services to users/subscribers. Each UE 801 and the MME 821 may include an MM or EMM sublayer, and an MM context may be established in the UE 801 and the MME 821 when an attach procedure is successfully completed. The MM context may be a data structure or database object that stores MM-related information of the UE 801. The MMEs 821 may be coupled with the HSS 824 via an S6a reference point, coupled with the SGSN 825 via an S3 reference point, and coupled with the S-GW 822 via an S11 reference point.

The SGSN 825 may be a node that serves the UE 801 by tracking the location of an individual UE 801 and performing security functions. In addition, the SGSN 825 may perform Inter-EPC node signaling for mobility between 2G/3G and E-UTRAN 3GPP access networks; PDN and S-GW selection as specified by the MMEs 821; handling of UE 801 time zone functions as specified by the MMEs 821; and MME selection for handovers to E-UTRAN 3GPP access network. The S3 reference point between the MMEs 821 and the SGSN 825 may enable user and bearer information exchange for inter-3GPP access network mobility in idle and/or active states.

The HSS 824 may comprise a database for network users, including subscription-related information to support the network entities' handling of communication sessions. The EPC 820 may comprise one or several HSSs 824, depending on the number of mobile subscribers, on the capacity of the equipment, on the organization of the network, etc. For example, the HSS 824 can provide support for routing/ roaming, authentication, authorization, naming/addressing resolution, location dependencies, etc. An S6a reference point between the HSS 824 and the MMEs 821 may enable transfer of subscription and authentication data for authenticating/authorizing user access to the EPC 820 between HSS 824 and the MMEs 821.

The S-GW 822 may terminate the S1 interface 713 ("S1-U" in FIG. 8) toward the RAN 810, and routes data packets between the RAN 810 and the EPC 820. In addition, the S-GW 822 may be a local mobility anchor point for inter-RAN node handovers and also may provide an anchor for inter-3GPP mobility. Other responsibilities may include lawful intercept, charging, and some policy enforcement. The S11 reference point between the S-GW 822 and the MMEs 821 may provide a control plane between the MMEs 821 and the S-GW 822. The S-GW 822 may be coupled with the P-GW 823 via an S5 reference point.

The P-GW 823 may terminate an SGi interface toward a PDN 830. The P-GW 823 may route data packets between the EPC 820 and external networks such as a network including the application server 730 (alternatively referred to as an "AF") via an IP interface 725 (see e.g., FIG. 7). In embodiments, the P-GW 823 may be communicatively coupled to an application server (application server 730 of FIG. 7 or PDN 830 in FIG. 8) via an IP communications interface 725 (see, e.g., FIG. 7). The S5 reference point between the P-GW 823 and the S-GW 822 may provide user plane tunneling and tunnel management between the P-GW 823 and the S-GW 822. The S5 reference point may also be used for S-GW 822 relocation due to UE 801 mobility and if the S-GW 822 needs to connect to a non-collocated P-GW 823 for the required PDN connectivity. The P-GW 823 may further include a node for policy enforcement and charging data collection (e.g., PCEF (not shown)). Additionally, the SGi reference point between the P-GW 823 and the packet data network (PDN) 830 may be an operator external public, a private PDN, or an intra operator packet data network, for example, for provision of IMS services. The P-GW 823 may be coupled with a PCRF 826 via a Gx reference point.

PCRF 826 is the policy and charging control element of the EPC 820. In a non-roaming scenario, there may be a single PCRF 826 in the Home Public Land Mobile Network (HPLMN) associated with a UE 801's Internet Protocol Connectivity Access Network (IP-CAN) session. In a roaming scenario with local breakout of traffic, there may be two PCRFs associated with a UE 801's IP-CAN session, a Home PCRF (H-PCRF) within an HPLMN and a Visited PCRF (V-PCRF) within a Visited Public Land Mobile Network (VPLMN). The PCRF 826 may be communicatively coupled to the application server 830 via the P-GW 823. The application server 830 may signal the PCRF 826 to indicate a new service flow and select the appropriate QoS and charging parameters. The PCRF 826 may provision this rule into a PCEF (not shown) with the appropriate TFT and QCI, which commences the QoS and charging as specified by the application server 830. The Gx reference point between the PCRF 826 and the P-GW 823 may allow for the transfer of QoS policy and charging rules from the PCRF 826 to PCEF in the P-GW 823. An Rx reference point may reside between the PDN 830 (or "AF 830") and the PCRF 826.

Figure 9:
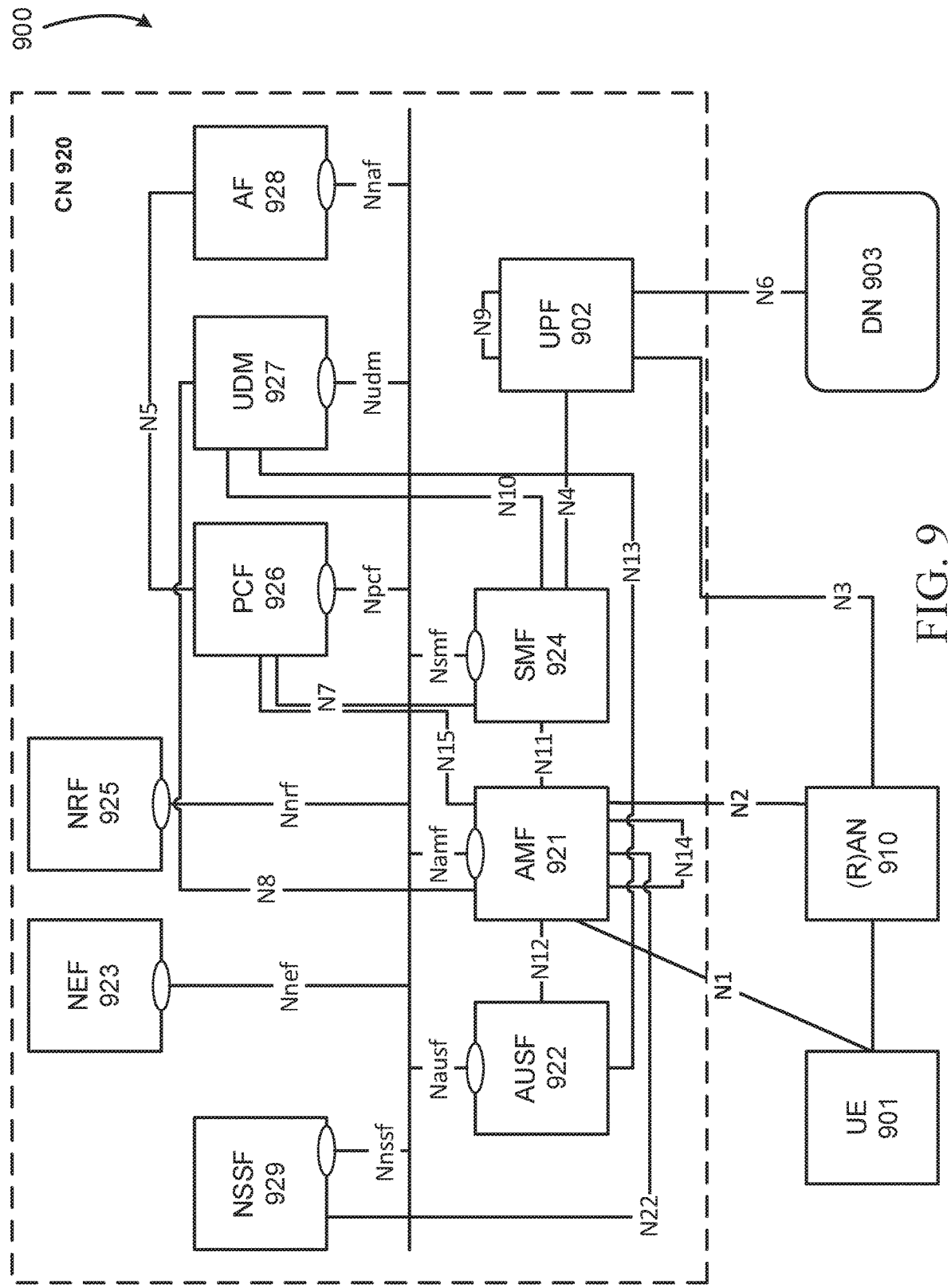
FIG. 9 illustrates another example architecture of a system including a core network, according to some implementations of the present disclosure.

FIG. 9 illustrates an architecture of a system 900 including a second CN 920 in accordance with various embodiments. The system 900 is shown to include a UE 901, which may be the same or similar to the UEs 701 and UE 801 discussed previously; a (R)AN 910, which may be the same or similar to the RAN 710 and RAN 810 discussed previously, and which may include RAN nodes 711 discussed previously; and a DN 903, which may be, for example, operator services, Internet access or 3rd party services; and a 5GC 920. The 5GC 920 may include an AUSF 922; an AMF 921; a SMF 924; a NEF 923; a PCF 926; a NRF 925; a UDM 927; an AF 928; a UPF 902; and a NSSF 929.

The UPF 902 may act as an anchor point for intra-RAT and inter-RAT mobility, an external PDU session point of interconnect to DN 903, and a branching point to support multi-homed PDU session. The UPF 902 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 902 may include an uplink classifier to support routing traffic flows to a data network. The DN 903 may represent various network operator services, Internet access, or third party services. DN 903 may include, or be similar to, application server 730 discussed previously. The UPF 902 may interact with the SMF 924 via an N4 reference point between the SMF 924 and the UPF 902.

The AUSF 922 may store data for authentication of UE 901 and handle authentication-related functionality. The AUSF 922 may facilitate a common authentication framework for various access types. The AUSF 922 may communicate with the AMF 921 via an N12 reference point between the AMF 921 and the AUSF 922; and may communicate with the UDM 927 via an N13 reference point between the UDM 927 and the AUSF 922. Additionally, the AUSF 922 may exhibit an Nausf service-based interface.

The AMF 921 may be responsible for registration management (e.g., for registering UE 901, etc.), connection management, reachability management, mobility management, and lawful interception of AMF-related events, and access authentication and authorization. The AMF 921 may be a termination point for the an N11 reference point between the AMF 921 and the SMF 924. The AMF 921 may provide transport for SM messages between the UE 901 and the SMF 924, and act as a transparent proxy for routing SM messages. AMF 921 may also provide transport for SMS messages between UE 901 and an SMSF (not shown by FIG. 9). AMF 921 may act as SEAF, which may include interaction with the AUSF 922 and the UE 901, receipt of an intermediate key that was established as a result of the UE 901 authentication process. Where USIM based authentication is used, the AMF 921 may retrieve the security material from the AUSF 922. AMF 921 may also include a SCM function, which receives a key from the SEA that it uses to derive access-network specific keys. Furthermore, AMF 921 may be a termination point of a RAN CP interface, which may include or be an N2 reference point between the (R)AN 910 and the AMF 921; and the AMF 921 may be a termination point of NAS (N1) signalling, and perform NAS ciphering and integrity protection.

AMF 921 may also support NAS signalling with a UE 901 over an N3 TWF interface. The N3TWF may be used to provide access to untrusted entities. N3TWF may be a termination point for the N2 interface between the (R)AN 910 and the AMF 921 for the control plane, and may be a termination point for the N3 reference point between the (R)AN 910 and the UPF 902 for the user plane. As such, the AMF 921 may handle N2 signalling from the SMF 924 and the AMF 921 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 901 and AMF 921 via an N1 reference point between the UE 901 and the AMF 921, and relay uplink and downlink user-plane packets between the UE 901 and UPF 902. The N3IWF also provides mechanisms for IPsec tunnel establishment with the UE 901. The AMF 921 may exhibit an Namf service-based interface, and may be a termination point for an N14 reference point between two AMFs 921 and an N17 reference point between the AMF 921 and a 5G-EIR (not shown by FIG. 9).

The UE 901 may need to register with the AMF 921 in order to receive network services. RM is used to register or deregister the UE 901 with the network (e.g., AMF 921), and establish a UE context in the network (e.g., AMF 921). The UE 901 may operate in an RM-REGISTERED state or an RM-DEREGISTERED state. In the RM DEREGISTERED state, the UE 901 is not registered with the network, and the UE context in AMF 921 holds no valid location or routing information for the UE 901 so the UE 901 is not reachable by the AMF 921. In the RM REGISTERED state, the UE 901 is registered with the network, and the UE context in AMF 921 may hold a valid location or routing information for the UE 901 so the UE 901 is reachable by the AMF 921. In the RM-REGISTERED state, the UE 901 may perform mobility Registration Update procedures, perform periodic Registration Update procedures triggered by expiration of the periodic update timer (e.g., to notify the network that the UE 901 is still active), and perform a Registration Update procedure to update UE capability information or to re-negotiate protocol parameters with the network, among others.

The AMF 921 may store one or more RM contexts for the UE 901, where each RM context is associated with a specific access to the network. The RM context may be a data structure, database object, etc. that indicates or stores, inter alia, a registration state per access type and the periodic update timer. The AMF 921 may also store a 5GC MM context that may be the same or similar to the (E)MM context discussed previously. In various embodiments, the AMF 921 may store a CE mode B Restriction parameter of the UE 901 in an associated MM context or RM context. The AMF 921 may also derive the value, when needed, from the UE's usage setting parameter already stored in the UE context (and/or MM/RM context).

CM may be used to establish and release a signaling connection between the UE 901 and the AMF 921 over the N1 interface. The signaling connection is used to enable NAS signaling exchange between the UE 901 and the CN 920, and comprises both the signaling connection between the UE and the AN (e.g., RRC connection or UE-N3IWF connection for non-3GPP access) and the N2 connection for the UE 901 between the AN (e.g., RAN 910) and the AMF 921. The UE 901 may operate in one of two CM states, CM-IDLE mode or CM-CONNECTED mode. When the UE 901 is operating in the CM-IDLE state/mode, the UE 901 may have no NAS signaling connection established with the AMF 921 over the N1 interface, and there may be (R)AN 910 signaling connection (e.g., N2 and/or N3 connections) for the UE 901. When the UE 901 is operating in the CM-CONNECTED state/mode, the UE 901 may have an established NAS signaling connection with the AMF 921 over the N1 interface, and there may be a (R)AN 910 signaling connection (e.g., N2 and/or N3 connections) for the UE 901. Establishment of an N2 connection between the (R)AN 910 and the AMF 921 may cause the UE 901 to transition from CM-IDLE mode to CM-CONNECTED mode, and the UE 901 may transition from the CM-CONNECTED mode to the CM-IDLE mode when N2 signaling between the (R)AN 910 and the AMF 921 is released.

The SMF 924 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 901 and a data network (DN) 903 identified by a Data Network Name (DNN). PDU sessions may be established upon UE 901 request, modified upon UE 901 and 5GC 920 request, and released upon UE 901 and 5GC 920 request using NAS SM signaling exchanged over the N1 reference point between the UE 901 and the SMF 924. Upon request from an application server, the 5GC 920 may trigger a specific application in the UE 901. In response to receipt of the trigger message, the UE 901 may pass the trigger message (or relevant parts/information of the trigger message) to one or more identified applications in the UE 901. The identified application(s) in the UE 901 may establish a PDU session to a specific DNN. The SMF 924 may check whether the UE 901 requests are compliant with user subscription information associated with the UE 901. In this regard, the SMF 924 may retrieve and/or request to receive update notifications on SMF 924 level subscription data from the UDM 927.

The SMF 924 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 924 may be included in the system 900, which may be between another SMF 924 in a visited network and the SMF 924 in the home network in roaming scenarios. Additionally, the SMF 924 may exhibit the Nsmf service-based interface.

The NEF 923 may provide means for securely exposing the services and capabilities provided by 3GPP network functions for third party, internal exposure/re-exposure, Application Functions (e.g., AF 928), edge computing or fog computing systems, etc. In such embodiments, the NEF 923 may authenticate, authorize, and/or throttle the AFs. NEF 923 may also translate information exchanged with the AF 928 and information exchanged with internal network functions. For example, the NEF 923 may translate between an AF-Service-Identifier and an internal 5GC information. NEF 923 may also receive information from other network functions (NFs) based on exposed capabilities of other network functions. This information may be stored at the NEF 923 as structured data, or at a data storage NF using standardized interfaces. The stored information can then be re-exposed by the NEF 923 to other NFs and AFs, and/or used for other purposes such as analytics. Additionally, the NEF 923 may exhibit an Nnef service-based interface.

The NRF 925 may support service discovery functions, receive NF discovery requests from NF instances, and provide the information of the discovered NF instances to the NF instances. NRF 925 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 925 may exhibit the Nnrf service-based interface.

The PCF 926 may provide policy rules to control plane function(s) to enforce them, and may also support unified policy framework to govern network behaviour. The PCF 926 may also implement an FE to access subscription information relevant for policy decisions in a UDR of the UDM 927. The PCF 926 may communicate with the AMF 921 via an N15 reference point between the PCF 926 and the AMF 921, which may include a PCF 926 in a visited network and the AMF 921 in case of roaming scenarios. The PCF 926 may communicate with the AF 928 via an N5 reference point between the PCF 926 and the AF 928; and with the SMF 924 via an N7 reference point between the PCF 926 and the SMF 924. The system 900 and/or CN 920 may also include an N24 reference point between the PCF 926 (in the home network) and a PCF 926 in a visited network. Additionally, the PCF 926 may exhibit an Npcf service-based interface.

The UDM 927 may handle subscription-related information to support the network entities' handling of communication sessions, and may store subscription data of UE 901. For example, subscription data may be communicated between the UDM 927 and the AMF 921 via an N8 reference point between the UDM 927 and the AMF. The UDM 927 may include two parts, an application FE and a UDR (the FE and UDR are not shown by FIG. 9). The UDR may store subscription data and policy data for the UDM 927 and the PCF 926, and/or structured data for exposure and application data (including PFDs for application detection, application request information for multiple UEs 901) for the NEF 923. The Nudr service-based interface may be exhibited by the UDR 221 to allow the UDM 927, PCF 926, and NEF 923 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 924 via an N10 reference point between the UDM 927 and the SMF 924. UDM 927 may also support SMS management, wherein an SMS-FE implements the similar application logic as discussed previously. Additionally, the UDM 927 may exhibit the Nudm service-based interface.

The AF 928 may provide application influence on traffic routing, provide access to the NCE, and interact with the policy framework for policy control. The NCE may be a mechanism that allows the 5GC 920 and AF 928 to provide information to each other via NEF 923, which may be used for edge computing implementations. In such implementations, the network operator and third party services may be hosted close to the UE 901 access point of attachment to achieve an efficient service delivery through the reduced end-to-end latency and load on the transport network. For edge computing implementations, the 5GC may select a UPF 902 close to the UE 901 and execute traffic steering from the UPF 902 to DN 903 via the N6 interface. This may be based on the UE subscription data, UE location, and information provided by the AF 928. In this way, the AF 928 may influence UPF (re)selection and traffic routing. Based on operator deployment, when AF 928 is considered to be a trusted entity, the network operator may permit AF 928 to interact directly with relevant NFs. Additionally, the AF 928 may exhibit an Naf service-based interface.

The NSSF 929 may select a set of network slice instances serving the UE 901. The NSSF 929 may also determine allowed NSSAI and the mapping to the subscribed S-NSSAIs, if needed. The NSSF 929 may also determine the AMF set to be used to serve the UE 901, or a list of candidate AMF(s) 921 based on a suitable configuration and possibly by querying the NRF 925. The selection of a set of network slice instances for the UE 901 may be triggered by the AMF 921 with which the UE 901 is registered by interacting with the NSSF 929, which may lead to a change of AMF 921. The NSSF 929 may interact with the AMF 921 via an N22 reference point between AMF 921 and NSSF 929; and may communicate with another NSSF 929 in a visited network via an N31 reference point (not shown by FIG. 9). Additionally, the NSSF 929 may exhibit an Nnssf service-based interface.

As discussed previously, the CN 920 may include an SMSF, which may be responsible for SMS subscription checking and verification, and relaying SM messages to/from the UE 901 to/from other entities, such as an SMS-GMSC/IWMSC/SMS-router. The SMS may also interact with AMF 921 and UDM 927 for a notification procedure that the UE 901 is available for SMS transfer (e.g., set a UE not reachable flag, and notifying UDM 927 when UE 901 is available for SMS).

The CN 120 may also include other elements that are not shown by FIG. 9, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 9). Individual NFs may share a UDSF for storing their respective unstructured data or individual NFs may each have their own UDSF located at or near the individual NFs. Additionally, the UDSF may exhibit an Nudsf service-based interface (not shown by FIG. 9). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 9 for clarity. In one example, the CN 920 may include an Nx interface, which is an inter-CN interface between the MME (e.g., MME 821) and the AMF 921 in order to enable interworking between CN 920 and CN 820. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 10:
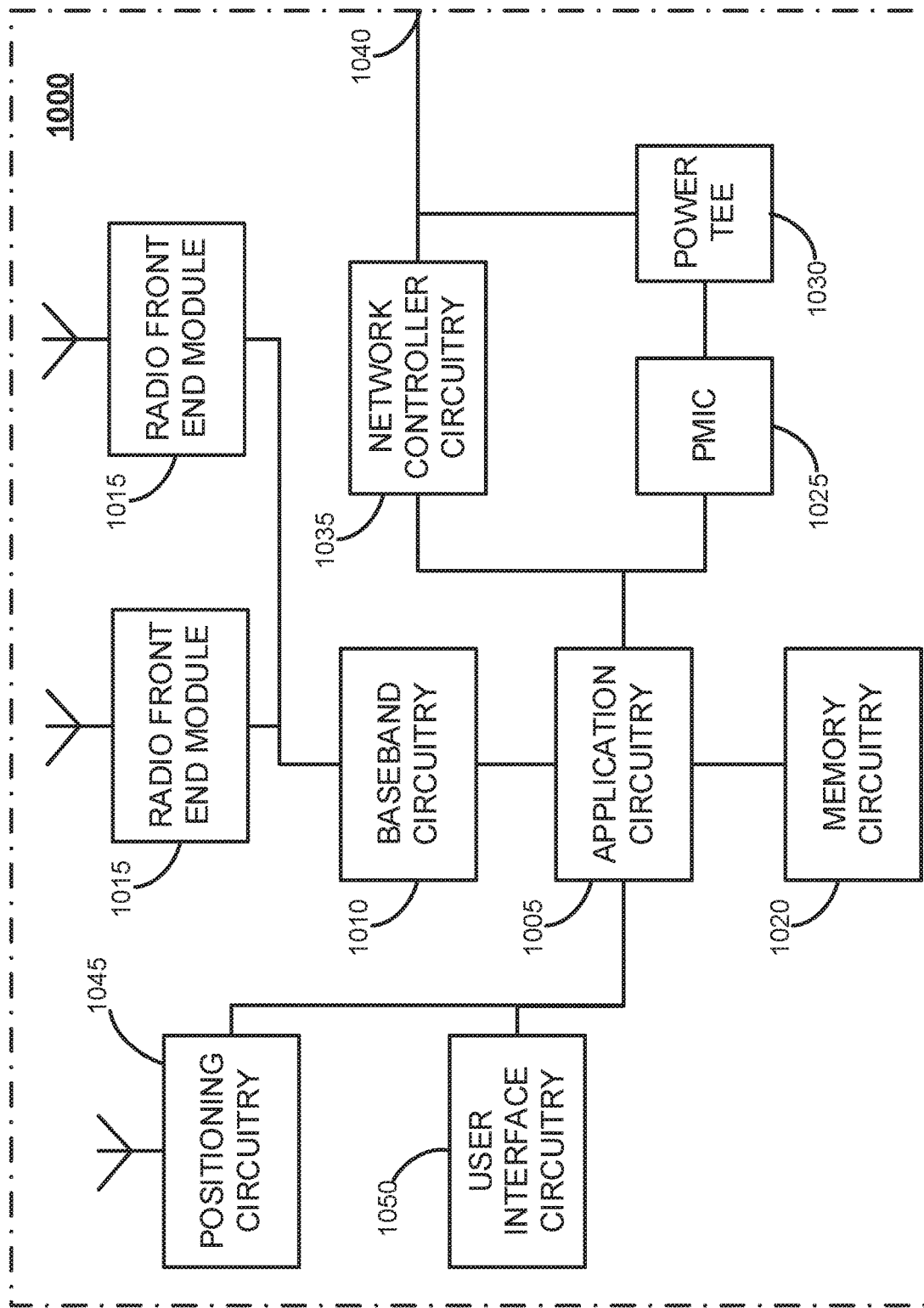
FIG. 10 illustrates an example of infrastructure equipment, according to some implementations of the present disclosure.

FIG. 10 illustrates an example of infrastructure equipment 1000 in accordance with various embodiments. The infrastructure equipment 1000 (or "system 1000") may be implemented as a base station, radio head, RAN node such as the RAN nodes 711 and/or AP 706 shown and described previously, application server(s) 730, and/or any other element/device discussed herein. In other examples, the system 1000 could be implemented in or by a UE.

The system 1000 includes application circuitry 1005, baseband circuitry 1010, one or more radio front end modules (RFEMs) 1015, memory circuitry 1020, power management integrated circuitry (PMIC) 1025, power tee circuitry 1030, network controller circuitry 1035, network interface connector 1040, satellite positioning circuitry 1045, and user interface circuitry 1050. In some embodiments, the device 1000 may include additional elements such as, for example, memory/storage, display, camera, ?sensor, or input/output (I/O) interface.? In other embodiments, the components described below may be included in more than one device. For example, said circuitries may be separately included in more than one device for CRAN, vBBU, or other like implementations.

Application circuitry 1005 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or JO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1005 may be coupled with or may include memory/storage elements and may be configured to ?execute instructions stored in the memory/storage to enable various applications or ?operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1005 may comprise, or may be, a special-purpose processor/controller to operate according to the various embodiments herein. As examples, the processor(s) of application circuitry 1005 may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1000 may not utilize application circuitry 1005, and instead may include a special-purpose processor/controller to process IP data received from an EPC or 5GC, for example.

In some implementations, the application circuitry 1005 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one ?or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1005 may comprise logic blocks or logic fabric, and other interconnected resources that may be programmed to perform various functions, such as the procedures, methods, functions, etc. of the various embodiments discussed herein. In such embodiments, the circuitry of application circuitry 1005 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 1010 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1010 are discussed infra with regard to FIG. 12.

User interface circuitry 1050 may include one or more user ?interfaces designed ?to enable user interaction with the system 1000 or peripheral component ?interfaces designed ?to enable peripheral component interaction with the system 1000. User ?interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, ?speakers or other audio emitting devices, microphones, a printer, a scanner, a headset, a display screen or display device, etc. Peripheral component interfaces may include, but are ?not limited to, a ?nonvolatile memory port, a universal serial bus (USB) port, an audio jack, a power supply ?interface, etc.

The radio front end modules (RFEMs) 1015 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1211 of FIG. 12 infra), and the RFEM may be connected to multiple antennas. In alternative implementations, both mmWave and sub-mmWave radio functions may be implemented in the same physical RFEM 1015, which incorporates both mmWave antennas and sub-mmWave.

The memory circuitry 1020 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1020 may be implemented as one or more of solder down packaged integrated circuits, socketed memory modules and plug-in memory cards.

The PMIC 1025 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1030 may provide for electrical power drawn from a network cable to provide both power supply and data connectivity to the infrastructure equipment 1000 using a single cable.

The network controller circuitry 1035 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1000 via network interface connector 1040 using a physical connection, which may be electrical (commonly referred to as a "copper interconnect"), optical, or wireless. The network controller circuitry 1035 may include one or more dedicated processors and/or FPGAs to communicate using one or more of the aforementioned protocols. In some implementations, the network controller circuitry 1035 may include multiple controllers to provide connectivity to other networks using the same or different protocols.

The positioning circuitry 1045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1045 comprises various hardware elements (e.g., including hardware devices such as switches, filters, amplifiers, antenna elements, and the like to facilitate OTA communications) ?to communicate with ?components of a positioning network, such as navigation satellite constellation nodes. In some embodiments, the positioning circuitry 1045 may include a Micro-Technology for Positioning, Navigation, and Timing (Micro-PNT) IC that uses a master timing clock to perform position tracking/estimation without GNSS assistance. The positioning circuitry 1045 may also be ?part of, or interact with, the baseband circuitry 1010 and/or RFEMs 1015 ?to communicate with the nodes and ?components of the positioning network. The positioning circuitry 1045 may also provide position data and/or time data to the application circuitry 1005, which may use the data to synchronize operations with various infrastructure (e.g., RAN nodes 711, etc.), or the like.

The components shown by FIG. 10 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 11:
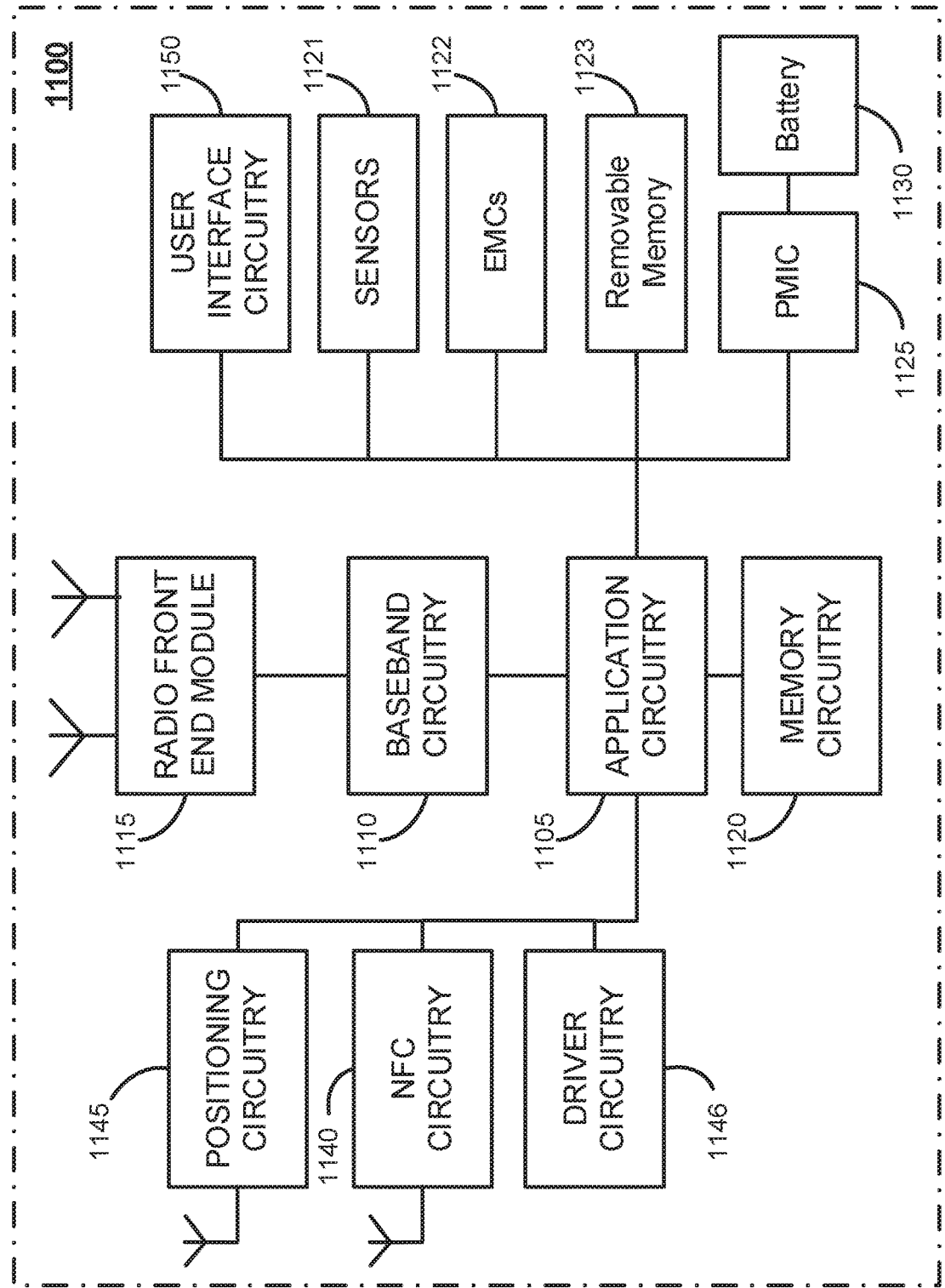
FIG. 11 illustrates an example of a platform or device, according to some implementations of the present disclosure.

FIG. 11 illustrates an example of a platform 1100 (or "device 1100") in accordance with various embodiments. In embodiments, the computer platform 1100 may be suitable for use as UEs 701, 801, 901, application servers 730, and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1105 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1105 may be coupled with or may include memory/storage elements and may be configured to ?execute instructions stored in the memory/storage to enable various applications or ?operating systems to run on the system 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1005 may comprise, or may be, a special-purpose processor/controller to operate according to the various embodiments herein.

As examples, the processor(s) of application circuitry 1105 may include an Apple A-series processor. The processors of the application circuitry 1105 may also be one or more of Intel® Architecture Core™ based processor, such as a Quark™ an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1105 may be a part of a system on a chip (SoC) in which the application circuitry 1105 and other components are formed into a single integrated circuit.

Additionally or alternatively, application circuitry 1105 may include circuitry such as, but not limited to, one ?or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1105 may comprise logic blocks or logic fabric, and other interconnected resources that may be programmed to perform various functions, such as the procedures, methods, functions, etc. of the various embodiments discussed herein. In such embodiments, the circuitry of application circuitry 1105 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1110 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1110 are discussed infra with regard to FIG. 12.

The RFEMs 1115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1211 of FIG. 12 infra), and the RFEM may be connected to multiple antennas. In alternative implementations, both mmWave and sub-mmWave radio functions may be implemented in the same physical RFEM 1115, which incorporates both mmWave antennas and sub-mmWave.

The memory circuitry 1120 may include any number and type of memory devices used to provide for a given amount of system memory. As examples, the memory circuitry 1120 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1120 may be developed in accordance with a Joint Electron Devices Engineering Council (JEDEC) low power double data rate (LPDDR)-based design, such as LPDDR2, LPDDR3, LPDDR4, or the like. Memory circuitry 1120 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1120 may be on-die memory or registers associated with the application circuitry 1105. To provide for persistent storage of information such as data, applications, operating systems and so forth, memory circuitry 1120 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1100 may incorporate the three-dimensional (3D) cross-point (XPOINT) memories from Intel® and Micron®.

Removable memory circuitry 1123 may include devices, circuitry, enclosures/housings, ports or receptacles, etc. used to couple portable data storage devices with the platform 1100. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1100 may also include interface circuitry (not shown) that is used to connect external devices with the platform 1100. The external devices connected to the platform 1100 via the interface circuitry include sensor circuitry 1121 and electro-mechanical components (EMCs) 1122, as well as removable memory devices coupled to removable memory circuitry 1123.

The sensor circuitry 1121 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1122 include devices, modules, or subsystems whose purpose is to enable platform 1100 to change its state, position, and/or orientation, or move or control a mechanism or (sub)system. Additionally, EMCs 1122 may be configured to generate and send messages/signalling to other components of the platform 1100 to indicate a current state of the EMCs 1122. Examples of the EMCs 1122 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1100 is configured to operate one or more EMCs 1122 based on one or more captured events and/or instructions or control signals received from a service provider and/or various clients.

In some implementations, the interface circuitry may connect the platform 1100 with positioning circuitry 1145. The positioning circuitry 1145 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1145 comprises various hardware elements (e.g., including hardware devices such as switches, filters, amplifiers, antenna elements, and the like to facilitate OTA communications) ?to communicate with ?components of a positioning network, such as navigation satellite constellation nodes. In some embodiments, the positioning circuitry 1145 may include a Micro-PNT IC that uses a master timing clock to perform position tracking/estimation without GNSS assistance. The positioning circuitry 1145 may also be ?part of, or interact with, the baseband circuitry 1010 and/or RFEMs 1115 ?to communicate with the nodes and ?components of the positioning network. The positioning circuitry 1145 may also provide position data and/or time data to the application circuitry 1105, which may use the data to synchronize operations with various infrastructure (e.g., radio base stations), for turn-by-turn navigation applications, or the like In some implementations, the interface circuitry may connect the platform 1100 with Near-Field Communication (NFC) circuitry 1140. NFC circuitry 1140 is configured to provide contactless, short-range communications based on radio frequency identification (RFID) standards, wherein magnetic field induction is used to enable communication between NFC circuitry 1140 and NFC-enabled devices external to the platform 1100 (e.g., an "NFC touchpoint"). NFC circuitry 1140 comprises an NFC controller coupled with an antenna element and a processor coupled with the NFC controller. The NFC controller may be a chip/IC providing NFC functionalities to the NFC circuitry 1140 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1140, or initiate data transfer between the NFC circuitry 1140 and another active NFC device (e.g., a smartphone or an NFC-enabled POS terminal) that is proximate to the platform 1100.

The driver circuitry 1146 may include software and hardware elements that operate to control particular devices that are embedded in the platform 1100, attached to the platform 1100, or otherwise communicatively coupled with the platform 1100. The driver circuitry 1146 may include individual drivers allowing other components of the platform 1100 to interact with or control various input/output (I/O) devices that may be present within, or connected to, the platform 1100. For example, driver circuitry 1146 may include a display driver to control and allow access to a display device, a touchscreen driver to control and allow access to a touchscreen interface of the platform 1100, sensor drivers to obtain sensor readings of sensor circuitry 1121 and control and allow access to sensor circuitry 1121, EMC drivers to obtain actuator positions of the EMCs 1122 and/or control and allow access to the EMCs 1122, a camera driver to control and allow access to an embedded image capture device, audio drivers to control and allow access to one or more audio devices.

The power management integrated circuitry (PMIC) 1125 (also referred to as "power management circuitry 1125") may manage power provided to various components of the platform 1100. In particular, with respect to the baseband circuitry 1110, the PMIC 1125 may control power-source selection, voltage scaling, battery charging, or DC-to-DC conversion. The PMIC 1125 may often be included when the platform 1100 is capable of being powered by a battery 1130, for example, when the device is included in a UE 701, 801, 901.

In some embodiments, the PMIC 1125 may control, or otherwise be part of, various power saving mechanisms of the platform 1100. For example, if the platform 1100 is in an RRC_Connected state, where it is still connected to the RAN node as it expects to receive traffic shortly, then it may enter a state known as Discontinuous Reception Mode (DRX) after a period of inactivity. During this state, the platform 1100 may power down for brief intervals of time and thus save power. If there is no data traffic activity for an extended period of time, then the platform 1100 may transition off to an RRC Idle state, where it disconnects from the network and does not perform operations such as channel quality feedback, handover, etc. The platform 1100 goes into a very low power state and it performs paging where again it periodically wakes up to listen to the network and then powers down again. The platform 1100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1130 may power the platform 1100, although in some examples the platform 1100 may be mounted deployed in a fixed location, and may have a power supply coupled to an electrical grid. The battery 1130 may be a lithium ion battery, a metal-air battery, such as a zinc-air battery, an aluminum-air battery, a lithium-air battery, and the like. In some implementations, such as in V2X applications, the battery 1130 may be a typical lead-acid automotive battery.

In some implementations, the battery 1130 may be a "smart battery," which includes or is coupled with a Battery Management System (BMS) or battery monitoring integrated circuitry. The BMS may be included in the platform 1100 to track the state of charge (SoCh) of the battery 1130. The BMS may be used to monitor other parameters of the battery 1130 to provide failure predictions, such as the state of health (SoH) and the state of function (SoF) of the battery 1130. The BMS may communicate the information of the battery 1130 to the application circuitry 1105 or other components of the platform 1100. The BMS may also include an analog-to-digital (ADC) convertor that allows the application circuitry 1105 to directly monitor the voltage of the battery 1130 or the current flow from the battery 1130. The battery parameters may be used to determine actions that the platform 1100 may perform, such as transmission frequency, network operation, sensing frequency, and the like.

A power block, or other power supply coupled to an electrical grid may be coupled with the BMS to charge the battery 1130. In some examples, the power block XS30 may be replaced with a wireless power receiver to obtain the power wirelessly, for example, through a loop antenna in the computer platform 1100. In these examples, a wireless battery charging circuit may be included in the BMS. The specific charging circuits chosen may depend on the size of the battery 1130, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1150 includes various input/output (I/O) devices present within, or connected to, the platform 1100, and includes one or more user ?interfaces designed ?to enable user interaction with the platform 1100 and/or peripheral component ?interfaces designed ?to enable peripheral component interaction with the platform 1100. The user interface circuitry 1150 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1100. The output device circuitry may also include speakers or other audio emitting devices, printer(s), and/or the like. In some embodiments, the sensor circuitry 1121 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are ?not limited to, a ?non-volatile memory port, a USB port, an audio jack, a power supply ?interface, etc.

Although not shown, the components of platform 1100 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 12:
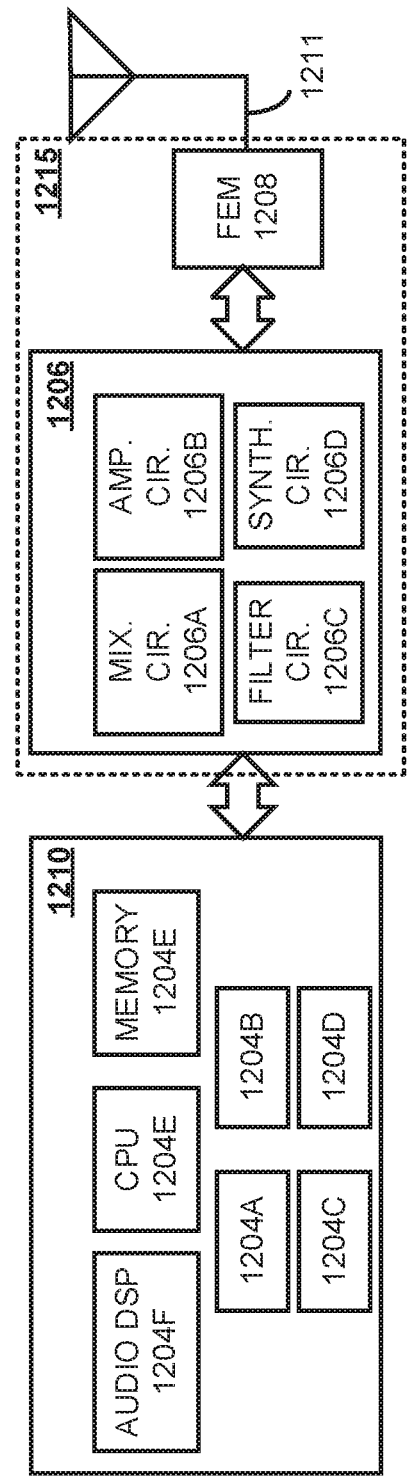
FIG. 12 illustrates example components of baseband circuitry and radio front end circuitry, according to some implementations of the present disclosure.

FIG. 12 illustrates example components of baseband circuitry 1210 and radio front end modules (RFEM) 1215 in accordance with various embodiments. The baseband circuitry 1210 corresponds to the baseband circuitry 1010 and 1110 of FIGS. 10 and 11, respectively. The RFEM 1215 corresponds to the RFEM 1015 and 1115 of FIGS. 10 and 11, respectively. As shown, the RFEMs 1215 may include Radio Frequency (RF) circuitry 1206, front-end module (FEM) circuitry 1208, antenna array 1211 coupled together at least as shown.

The baseband circuitry 1210 includes circuitry and/or control logic configured to carry out various radio/network protocol and radio control functions that enable ?communication with one or more radio networks via the RF circuitry 1206. The radio control functions ?may include, but are not limited to, signal modulation/demodulation, encoding/decoding, radio frequency ?shifting, etc. In some embodiments, modulation/demodulation circuitry of the baseband circuitry 1210 may include Fast-Fourier Transform (FFT), precoding, or constellation mapping/demapping functionality. In some embodiments, encoding/decoding circuitry of the baseband circuitry 1210 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1210 is configured to process baseband signals received from a receive signal path of the RF circuitry 1206 and to generate baseband signals for a transmit signal path of the RF circuitry 1206. The baseband circuitry 1210 is configured to interface with application circuitry 1005/1105 (see FIGS. 10 and 11) for generation and processing of the baseband signals and for controlling operations of the RF circuitry 1206. The baseband circuitry 1210 may handle various radio control functions.

The aforementioned circuitry and/or control logic of the baseband circuitry 1210 may include one or more single or multi-core processors. For example, the one or more processors may include a 3G baseband processor 1204A, a 4G/LTE baseband processor 1204B, a 5G/NR baseband processor 1204C, or some other baseband processor(s) 1204D for other existing generations, generations in development or to be developed in the future (e.g., sixth generation (6G), etc.). In other embodiments, some or all of the functionality of baseband processors 1204A-D may be included in modules stored in the memory 1204G and executed via a Central Processing Unit (CPU) 1204E. In other embodiments, some or all of the functionality of baseband processors 1204A-D may be provided as hardware accelerators (e.g., FPGAs, ASICs, etc.) loaded with the appropriate bit streams or logic blocks stored in respective memory cells. In various embodiments, the memory 1204G may store program code of a real-time OS (RTOS), which when executed by the CPU 1204E (or other baseband processor), is to cause the CPU 1204E (or other baseband processor) to manage resources of the baseband circuitry 1210, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1210 includes one or more audio digital signal processor(s) (DSP) 1204F. The audio DSP(s) 1204F include elements for compression/decompression and echo cancellation and may include other suitable processing elements in other embodiments.

In some embodiments, each of the processors 1204A-1204E include respective memory interfaces to send/receive data to/from the memory 1204G. The baseband circuitry 1210 may further include one or more interfaces to communicatively couple to other circuitries/devices, such as an interface to send/receive data to/from memory external to the baseband circuitry 1210; an application circuitry interface to send/receive data to/from the application circuitry 1005/1105 of FIG. 10-XT); an RF circuitry interface to send/receive data to/from RF circuitry 1206 of FIG. 12; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1125.

In alternate embodiments (which may be combined with the above described embodiments), baseband circuitry 1210 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1210 may include protocol processing circuitry with one or more instances of control circuitry (not shown) to provide control functions for the digital baseband circuitry and/or radio frequency circuitry (e.g., the radio front end modules 1215).

Although not shown by FIG. 12, in some embodiments, the baseband circuitry 1210 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1210 and/or RF circuitry 1206 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1210 and/or RF circuitry 1206 are part of a Wi-Fi communication system. In the second example, the protocol processing circuitry would operate Wi-Fi MAC and logical link control (LLC) functions. The protocol processing circuitry may include one or more memory structures (e.g., 1204G) to store program code and data for operating the protocol functions, as well as one or more processing cores to execute the program code and perform various operations using the data. The baseband circuitry 1210 may also support radio communications for more than ?one wireless protocol.

The various hardware elements of the baseband circuitry 1210 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1210 may be suitably combined in a single chip or chipset, or disposed on a same circuit board. In another example, some or all of the constituent components of the baseband ?circuitry 1210 and RF circuitry 1206 may be implemented ?together such as, for example, a system on a chip (SoC) or System-in-Package (SiP). In another example, some or all of the constituent components of the baseband ?circuitry 1210 may be implemented as a separate SoC that is communicatively coupled with and RF circuitry 1206 (or multiple instances of RF circuitry 1206). In yet another example, some or all of the constituent components of the baseband ?circuitry 1210 and the application circuitry 1005/1105 may be implemented ?together as individual SoCs mounted to a same circuit board (e.g., a "multi-chip package"). ?

In some embodiments, the baseband circuitry 1210 may provide for communication ?compatible with one or more radio technologies. For example, in some embodiments, the ?baseband circuitry 1210 may support communication with an E-UTRAN or other WMAN, a ? WLAN, a WPAN. Embodiments in ?which the baseband circuitry 1210 is configured to support radio communications of more than ?one wireless protocol may be referred to as multi-mode baseband circuitry.

RF circuitry 1206 may enable communication with wireless networks using ?modulated ?electromagnetic radiation through a non-solid medium. In various embodiments, the ?RF circuitry 1206 may include switches, filters, amplifiers, etc. to facilitate the communication ?with the wireless network. RF circuitry 1206 may include a receive signal path, which may include circuitry to down-convert RF signals received from the FEM circuitry 1208 and provide baseband signals to the baseband circuitry 1210. RF circuitry 1206 may also include a transmit signal path, which may include circuitry to up-convert baseband signals provided by the baseband circuitry 1210 and provide RF output signals to the FEM circuitry 1208 for transmission.

In some embodiments, the receive signal path of the RF circuitry 1206 may include mixer circuitry 1206a, amplifier circuitry 1206b and filter circuitry 1206c. In some embodiments, the transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1210 for further processing. In some embodiments, the output baseband signals may be zero-frequency baseband signals, although this is not a requirement. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1210 and may be filtered by filter circuitry 1206c.

In some embodiments, the mixer circuitry 1206a of the receive signal path and the mixer circuitry 1206a of the transmit signal path may include two or more mixers and may be arranged for quadrature downconversion and upconversion, respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a of the transmit signal path may be arranged for direct downconversion and direct upconversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1210 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer.

In some embodiments, frequency input may be provided by a voltage controlled oscillator (VCO), although that is not a requirement. Divider control input may be provided by either the baseband circuitry 1210 or the application circuitry 1005/1105 depending on the desired output frequency. In some embodiments, a divider control input (e.g., N) may be determined from a look-up table based on a channel indicated by the application circuitry 1005/1105.

Synthesizer circuitry 1206d of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path, which may include circuitry configured to operate on RF signals received from antenna array 1211, amplify the received signals and provide the amplified versions of the received signals to the RF circuitry 1206 for further processing. FEM circuitry 1208 may also include a transmit signal path, which may include circuitry configured to amplify signals for transmission provided by the RF circuitry 1206 for transmission by one or more of antenna elements of antenna array 1211. In various embodiments, the amplification through the transmit or receive signal paths may be done solely in the RF circuitry 1206, solely in the FEM circuitry 1208, or in both the RF circuitry 1206 and the FEM circuitry 1208.

In some embodiments, the FEM circuitry 1208 may include a TX/RX switch to switch between transmit mode and receive mode operation. The FEM circuitry 1208 may include a receive signal path and a transmit signal path. The receive signal path of the FEM circuitry 1208 may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission by one or more antenna elements of the antenna array 1211.

The antenna array 1211 comprises one or more antenna elements, each of which is configured convert electrical signals into radio waves to travel through the air and to convert received radio waves into electrical signals. For example, digital baseband signals provided by the baseband circuitry 1210 is converted into analog RF signals (e.g., modulated waveform) that will be amplified and transmitted via the antenna elements of the antenna array 1211 including one or more antenna elements (not shown). The antenna elements may be omnidirectional, direction, or a combination thereof. The antenna elements may be formed in a multitude of arranges as are known and/or discussed herein. The antenna array 1211 may comprise microstrip antennas or printed antennas that are fabricated on the surface of one or more printed circuit boards. The antenna array 1211 may be formed in as a patch of metal foil (e.g., a patch antenna)

in a variety of shapes, and may be coupled with the RF circuitry 1206 and/or FEM circuitry 1208 using metal transmission lines or the like.

Processors of the application circuitry 1005/1105 and processors of the baseband circuitry 1210 may be used to execute elements of one or more instances of a protocol stack. For example, processors of the baseband circuitry 1210, alone or in combination, may be used execute Layer 3, Layer 2, or Layer 1 functionality, while processors of the application circuitry 1005/1105 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 13:
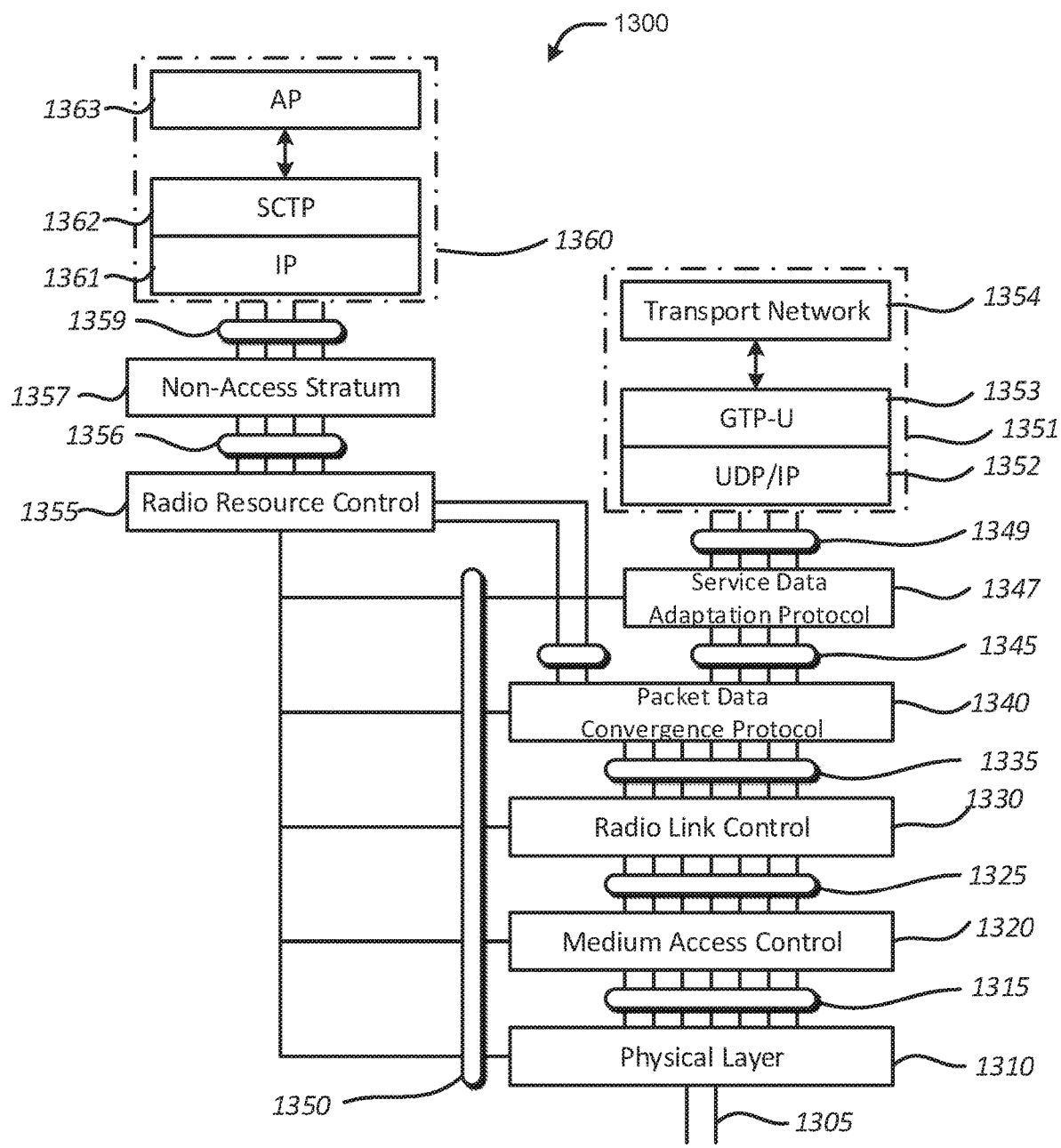
FIG. 13 illustrates example protocol functions that may be implemented in wireless communication systems, according to some implementations of the present disclosure.

FIG. 13 illustrates various protocol functions that may be implemented in a wireless communication device according to various embodiments. In particular, FIG. 13 includes an arrangement 1300 showing interconnections between various protocol layers/entities. The following description of FIG. 13 is provided for various protocol layers/entities that operate in conjunction with the 5G/NR system standards and LTE system standards, but some or all of the aspects of FIG. 13 may be applicable to other wireless communication network systems as well.

The protocol layers of arrangement 1300 may include one or more of PHY 1310, MAC 1320, RLC 1330, PDCP 1340, SDAP 1347, RRC 1355, and NAS layer 1357, in addition to other higher layer functions not illustrated. The protocol layers may include one or more service access points (e.g., items 1359, 1356, 1350, 1349, 1345, 1335, 1325, and 1315 in FIG. 13) that may provide communication between two or more protocol layers.

The PHY 1310 may transmit and receive physical layer signals 1305 that may be received from or transmitted to one or more other communication devices. The physical layer signals 1305 may comprise one or more physical channels, such as those discussed herein. The PHY 1310 may further perform link adaptation or adaptive modulation and coding (AMC), power control, cell search (e.g., for initial synchronization and handover purposes), and other measurements used by higher layers, such as the RRC 1355. The PHY 1310 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1310 may process requests from and provide indications to an instance of MAC 1320 via one or more PHY-SAP 1315. According to some embodiments, requests and indications communicated via PHY-SAP 1315 may comprise one or more transport channels.

Instance(s) of MAC 1320 may process requests from, and provide indications to, an instance of RLC 1330 via one or more MAC-SAPs 1325. These requests and indications communicated via the MAC-SAP 1325 may comprise one or more logical channels. The MAC 1320 may perform mapping between the logical channels and transport channels, multiplexing of MAC SDUs from one or more logical channels onto TBs to be delivered to PHY 1310 via the transport channels, de-multiplexing MAC SDUs to one or more logical channels from TBs delivered from the PHY 1310 via transport channels, multiplexing MAC SDUs onto TBs, scheduling information reporting, error correction through HARQ, and logical channel prioritization.

Instance(s) of RLC 1330 may process requests from and provide indications to an instance of PDCP 1340 via one or more radio link control service access points (RLC-SAP) 1335. These requests and indications communicated via RLC-SAP 1335 may comprise one or more RLC channels. The RLC 1330 may operate in a plurality of modes of operation, including: Transparent Mode™, Unacknowledged Mode (UM), and Acknowledged Mode (AM). The RLC 1330 may execute transfer of upper layer protocol data units (PDUs), error correction through automatic repeat request (ARQ) for AM data transfers, and concatenation, segmentation and reassembly of RLC SDUs for UM and AM data transfers. The RLC 1330 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1340 may process requests from and provide indications to instance(s) of RRC 1355 and/or instance(s) of SDAP 1347 via one or more packet data convergence protocol service access points (PDCP-SAP) 1345. These requests and indications communicated via PDCP-SAP 1345 may comprise one or more radio bearers. The PDCP 1340 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1347 may process requests from and provide indications to one or more higher layer protocol entities via one or more SDAP-SAP 1349. These requests and indications communicated via SDAP-SAP 1349 may comprise one or more QoS flows. The SDAP 1347 may map QoS flows to DRBs, and vice versa, and may also mark QFIs in DL and UL packets. A single SDAP entity 1347 may be configured for an individual PDU session. In the UL direction, the NG-RAN 710 may control the mapping of QoS Flows to DRB(s) in two different ways, reflective mapping or explicit mapping. For reflective mapping, the SDAP 1347 of a UE 701 may monitor the QFIs of the DL packets for each DRB, and may apply the same mapping for packets flowing in the UL direction. For a DRB, the SDAP 1347 of the UE 701 may map the UL packets belonging to the QoS flows(s) corresponding to the QoS flow ID(s) and PDU session observed in the DL packets for that DRB. To enable reflective mapping, the NG-RAN 910 may mark DL packets over the Uu interface with a QoS flow ID. The explicit mapping may involve the RRC 1355 configuring the SDAP 1347 with an explicit QoS flow to DRB mapping rule, which may be stored and followed by the SDAP 1347. In embodiments, the SDAP 1347 may only be used in NR implementations and may not be used in LTE implementations.

The RRC 1355 may configure, via one or more management service access points (M-SAP), aspects of one or more protocol layers, which may include one or more instances of PHY 1310, MAC 1320, RLC 1330, PDCP 1340 and SDAP 1347. In embodiments, an instance of RRC 1355 may process requests from and provide indications to one or more NAS entities 1357 via one or more RRC-SAPs 1356. The main services and functions of the RRC 1355 may include broadcast of system information (e.g., included in MIBs or SIBs related to the NAS), broadcast of system information related to the access stratum (AS), paging, establishment, maintenance and release of an RRC connection between the UE 701 and RAN 710 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1357 may form the highest stratum of the control plane between the UE 701 and the AMF 921. The NAS 1357 may support the mobility of the UEs 701 and the session management procedures to establish and maintain IP connectivity between the UE 701 and a P-GW in LTE systems.

According to various embodiments, one or more protocol entities of arrangement 1300 may be implemented in UEs 701, RAN nodes 711, AMF 921 in NR implementations or MME 821 in LTE implementations, UPF 902 in NR implementations or S-GW 822 and P-GW 823 in LTE implementations, or the like to be used for control plane or user plane communications protocol stack between the aforementioned devices. In such embodiments, one or more protocol entities that may be implemented in one or more of UE 701, gNB 711, AMF 921, etc. may communicate with a respective peer protocol entity that may be implemented in or on another device using the services of respective lower layer protocol entities to perform such communication. In some embodiments, a gNB-CU of the gNB 711 may host the RRC 1355, SDAP 1347, and PDCP 1340 of the gNB that controls the operation of one or more gNB-DUs, and the gNB-DUs of the gNB 711 may each host the RLC 1330, MAC 1320, and PHY 13?10 of the gNB 711.

In a first example, a control plane protocol stack may comprise, in order from highest layer to lowest layer, NAS 13?57, RRC 13?55, PDCP 1340, RLC 1330, MAC 13?20, and PHY 13?10. In this example, upper layers 1360 may be built on top of the NAS 13?57, which includes an IP layer 1361, an SCTP 1362, and an application layer signaling protocol (AP) 1363.

In NR implementations, the AP 1363 may be an NG application protocol layer (NGAP or NG-AP) 1363 for the NG interface 713 defined between the NG-RAN node 711 and the AMF 921, or the AP 1363 may be an Xn application protocol layer (XnAP or Xn-AP) 1363 for the Xn interface 712 that is defined between two or more RAN nodes 711.

The NG-AP 1363 may support the functions of the NG interface 713 and may comprise Elementary Procedures (EPs). An NG-AP EP may be a unit of interaction between the NG-RAN node 711 and the AMF 921. The NG-AP 1363 services may comprise two groups: UE-associated services (e.g., services related to a UE 701) and non-UE-associated services (e.g., services related to the whole NG interface instance between the NG-RAN node 711 and AMF 921). These services may include functions including, but not limited to: a paging function for the sending of paging requests to NG-RAN nodes 711 involved in a particular paging area; a UE context management function for allowing the AMF 921 to establish, modify, and/or release a UE context in the AMF 921 and the NG-RAN node 711; a mobility function for UEs 701 in ECM-CONNECTED mode for intra-system HOs to support mobility within NG-RAN and inter-system HOs to support mobility from/to EPS systems; a NAS Signaling Transport function for transporting or rerouting NAS messages between UE 701 and AMF 921; a NAS node selection function for determining an association between the AMF 921 and the UE 701; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 711 via CN 720; and/or other like functions.

The XnAP 1363 may support the functions of the Xn interface 712 and may comprise XnAP basic mobility procedures and XnAP global procedures. The XnAP basic mobility procedures may comprise procedures used to handle UE mobility within the NG RAN 711 (or E-UTRAN 810), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 701, such as Xn interface setup and reset procedures, NG-RAN update procedures, cell activation procedures, and the like.

In LTE implementations, the AP 1363 may be an S1 Application Protocol layer (S1-AP) 1363 for the S1 interface 713 defined between an E-UTRAN node 711 and an MME, or the AP 1363 may be an X2 application protocol layer (X2AP or X2-AP) 1363 for the X2 interface 712 that is defined between two or more E-UTRAN nodes 711.

The S1 Application Protocol layer (S1-AP) 1363 may support the functions of the S1 interface, and similar to the NG-AP discussed previously, the S1-AP may comprise S1-AP EPs. An S1-AP EP may be a unit of interaction between the E-UTRAN node 711 and an MME 821 within an LTE CN 720. The S1-AP 1363 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1363 may support the functions of the X2 interface 712 and may comprise X2AP basic mobility procedures and X2AP global procedures. The X2AP basic mobility procedures may comprise procedures used to handle UE mobility within the E-UTRAN 720, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 701, such as X2 interface setup and reset procedures, load indication procedures, error indication procedures, cell activation procedures, and the like.

The SCTP layer (alternatively referred to as the SCTP/IP layer) 1362 may provide guaranteed delivery of application layer messages (e.g., NGAP or XnAP messages in NR implementations, or S1-AP or X2AP messages in LTE implementations). The SCTP 1362 may ensure reliable delivery of signaling messages between the RAN node 711 and the AMF 921/MME 821 based, in part, on the IP protocol, supported by the IP 1361. The Internet Protocol layer (IP) 1361 may be used to perform packet addressing and routing functionality. In some implementations the IP layer 1361 may use point-to-point transmission to deliver and convey PDUs. In this regard, the RAN node 711 may comprise L2 and L1 layer communication links (e.g., wired or wireless) with the MME/AMF to exchange information.

In a second example, a user plane protocol stack may comprise, in order from highest layer to lowest layer, SDAP 1347, PDCP 1340, RLC 1330, MAC 13?20, and PHY 13?10. The user plane protocol stack may be used for communication between the UE 701, the RAN node 711, and UPF 902 in NR implementations or an S-GW 822 and P-GW 823 in LTE implementations. In this example, upper layers 1351 may be built on top of the SDAP 1347, and may include a user datagram protocol (UDP) and IP security layer (UDP/IP) 1352, a General Packet Radio Service (GPRS) Tunneling Protocol for the user plane layer (GTP-U) 1353, and a User Plane PDU layer (UP PDU) 1363.

The transport network layer 1354 (also referred to as a "transport layer") may be built on IP transport, and the GTP-U 1353 may be used on top of the UDP/IP layer 1352 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1353 may be used for carrying user data within the GPRS core network and between the radio access network and the core network. The user data transported can be packets in any of IPv4, IPv6, or PPP formats, for example. The UDP/IP 1352 may provide checksums for data integrity, port numbers for addressing different functions at the source and destination, and encryption and authentication on the selected data flows. The RAN node 711 and the S-GW 822 may utilize an S1-U interface to exchange user plane data via a protocol stack comprising an L1 layer (e.g., PHY 1310), an L2 layer (e.g., MAC 1320, RLC 1330, PDCP 1340, and/or SDAP 1347), the UDP/IP layer 1352, and the GTP-U 1353. The S-GW 822 and the P-GW 823 may utilize an S5/S8a interface to exchange user plane data via a protocol stack comprising an L1 layer, an L2 layer, the UDP/IP layer 1352, and the GTP-U 1353. As discussed previously, NAS protocols may support the mobility of the UE 701 and the session management procedures to establish and maintain IP connectivity between the UE 701 and the P-GW 823.

Moreover, although not shown by FIG. 13, an application layer may be present above the AP 1363 and/or the transport network layer 1354. The application layer may be a layer in which a user of the UE 701, RAN node 711, or other network element interacts with software applications being executed, for example, by application circuitry 1005 or application circuitry 1105, respectively. The application layer may also provide one or more interfaces for software applications to interact with communications systems of the UE 701 or RAN node 711, such as the baseband circuitry 1210. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 14:
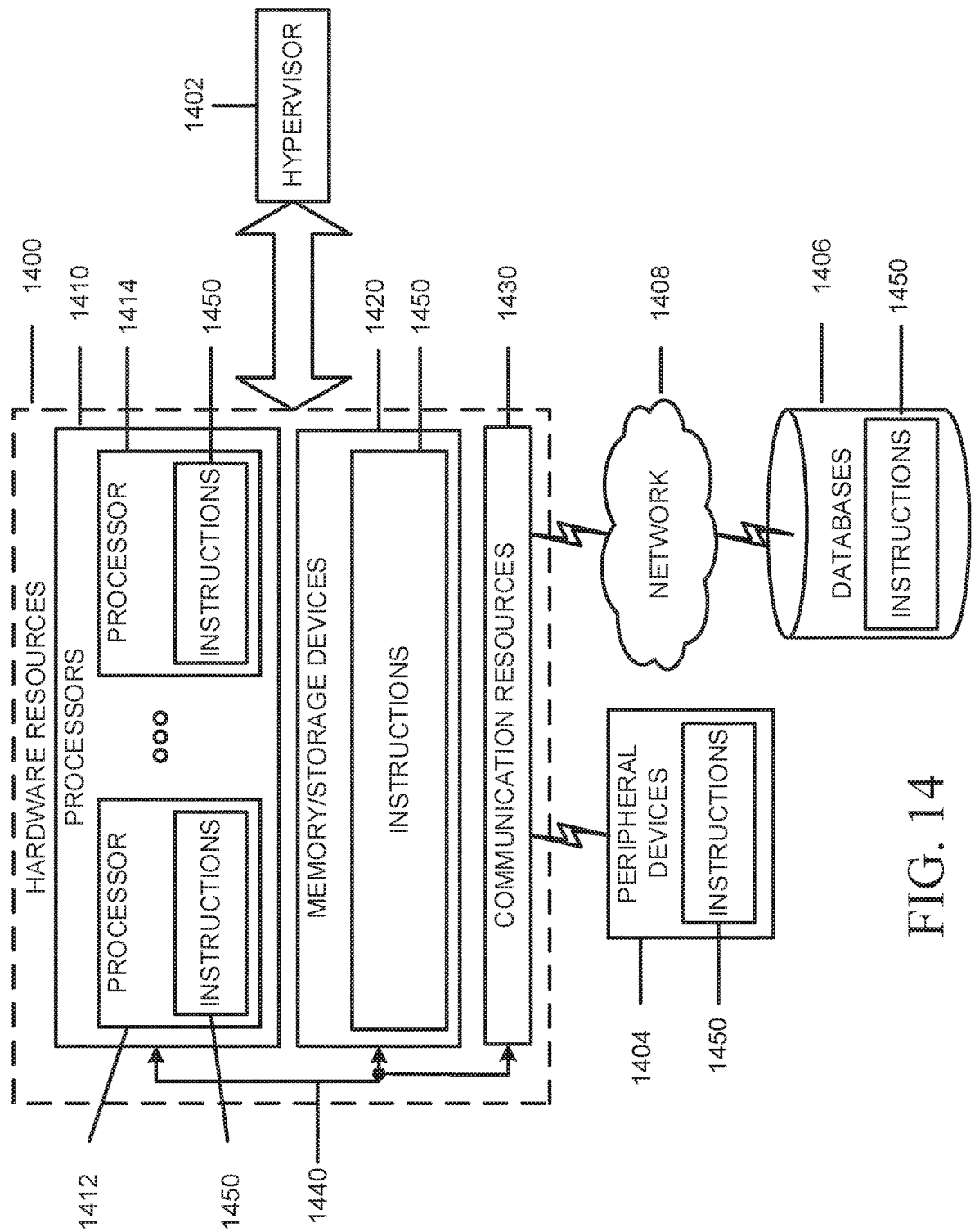
FIG. 14 illustrates an example of a computer system, according to some implementations of the present disclosure.

FIG. 14 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440. For embodiments where node virtualization (e.g., NFV) is utilized, a hypervisor 1402 may be executed to provide an execution environment for one or more network slices/sub-slices to utilize the hardware resources 1400.

The processors 1410 may include, for example, a processor 1412 and a processor 1414. The processor(s) 1410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1420 may include main memory, disk storage, or any suitable combination thereof. The memory/storage devices 1420 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1430 may include interconnection or network interface components or other suitable devices to communicate with one or more peripheral devices 1404 or one or more databases 1406 via a network 1408. For example, the communication resources 1430 may include wired communication components (e.g., for coupling via USB), cellular communication components, NFC components, Bluetooth® (or Bluetooth® Low Energy) components, Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

What is claimed is:

1. A method comprising:
   receiving a configuration for monitoring a wake up signal (WUS), wherein the configuration comprises information indicative of one or more of: one or more component carriers (CCs), a bandwidth part (BWP), a control resource set (CORESET), and a search space (SS);
   monitoring, based on the configuration, a physical downlink control channel (PDCCH) for downlink control information (DCI) associated with the WUS;
   detecting the DCI that comprises a common indication block that applies to a plurality of user equipment (UE)

and a plurality of UE-specific indication blocks, wherein the UE-specific indication blocks include a plurality of fields including indication functions, wherein the plurality of fields each include information for different component carriers (CCs) or CC groups, and wherein the information is shared among the different CCs or CC groups; and receiving the WUS in response to detecting the DCI and based at least on the common indication block that applies to the plurality of UE and the plurality of UE-specific indication blocks.

2. The method of claim 1, wherein the configuration further comprises information indicative of one or more of:
a starting position of a UE specific field block;
a size of the UE specific field block;
an information field;
a plurality of component carriers (CCs) that share a radio frequency (RF) chain, wherein the plurality of component carriers comprise a primary cell (PCell) and a secondary cell (SCell);
a number of discontinuous reception (DRX) cycles;
a resource allocation for a physical uplink control channel (PUCCH), a physical uplink shared channel (PUSCH), a modulation and coding scheme (MCS), a redundancy version (RV), or a hybrid acknowledge request (HARQ) process for the PUSCH;
a transmit power control (TPC) command for the PUCCH, the PUSCH, the MCS, the RV, or the HARQ process for the PUSCH;
a field size of a common field;
a pair of a BWP and CC;
a timer indicating a duration after which a user equipment for which the configuration was received should revert to a default scheduling scheme; or
one or more time domain resource allocation (TDRA) tables.

3. The method of claim 1, wherein the DCI comprises an indication of one or more of:
a wake up duration for a user equipment for which the DCI was detected,
a wake up duration,
a BWP associated with one or more CCs,
aperiodic channel state information (A-CSI) for triggering CSI associated with one or more CCs,
a resource allocation,
a transmit power control (TPC) command,
a modulation and coding scheme (MCS),
a redundancy version (RV),
a hybrid acknowledge request (HARQ) process for a physical uplink shared channel (PUSCH), or
an antenna adaptation.

4. The method of claim 1, wherein the monitoring is performed for a user equipment (UE) when the UE is operating in a discontinuous reception off (DRX-OFF) state.

5. The method of claim 1, wherein monitoring the PDCCH for the DCI associated with the WUS comprises:
determining, using data indicating that the DCI associated with the WUS is prioritized over monitoring the PDCCH for other types of DCI, to skip monitoring, during a time period, of the PDCCH for the other types of DCI; and
monitoring, during the time period, the PDCCH only for the DCI associated with the WUS.

6. The method of claim 1, wherein the WUS is for a user equipment (UE) from a plurality of UEs, and wherein the WUS comprises at least one of: (i) information that applies to each UE of the plurality of UEs, or (ii) information that is specific to the UE of the plurality of UEs.

7. The method of claim 1, wherein the WUS is specific to a user equipment (UE) from a plurality of UEs that each receive the configuration.

8. The method of claim 1, wherein the PDCCH shares a common search space (CSS) with an existing DCI format.

9. The method of claim 1, wherein a search space (SS) for the PDCCH is configured by high layer signaling, wherein a configuration includes at least one of: periodicity, offset, duration, control resource set (CORESET) identifier (ID), search space (SS) ID, transmission configuration indication (TCI) state, common search space (CSS) flag, or aggregation levels (ALs).

10. The method of claim 1, wherein the monitoring is performed for a user equipment (UE) during a DRX-off period for the UE.

11. The method of claim 1, wherein monitoring of the DCI is prioritized.

12. The method of claim 1, wherein the configuration further comprises: a set of search spaces (SSs) or control resource sets (CORESETs) with different transmission configuration indication (TCI) states is configured, and wherein the different SSs or CORESETs with different TCI states are located in a number of consecutive symbols within one or two consecutive slots of WUS monitoring window.

13. The method of claim 1, wherein a DCI payload includes: (i) a common indication block that applies to all of a plurality of user equipment (UEs), or (ii) a UE-specific information block that applies to a UE from the plurality of UEs for which the DCI was detected.

14. The method of claim 1, comprising:
detecting the DCI that comprises a common indication block that applies to a plurality of user equipment (UE) and a plurality of user equipment-specific indication blocks, wherein the user equipment-specific indication blocks each include indication information for different component carriers (CCs), and wherein each field for a CC further includes indication information for that CC, wherein:
receiving the WUS in response to detecting the DCI is based at least on the common indication block that applies to the plurality of UE and the plurality of user equipment-specific indication blocks.

15. The method of claim 1, comprising:
detecting the DCI that includes an indication information for different component carriers (CCs), wherein, for each CC, the indication information further includes a common indication block that applies to a plurality of user equipment (UE) and a plurality of UE-specific indication blocks, wherein:
receiving the WUS in response to detecting the DCI is based at least on the indication information for different component carriers.

16. The method of claim 1, wherein the DCI includes a wake up indication that indicates whether a user equipment should wake up for next N DRX cycles, where N is a predetermined number or is indicated by the DCI.

17. The method of claim 1, wherein:
the one or more component carriers (CCs) are a plurality of CCs that comprise a primary cell and secondary cells, and
monitoring the PDCCH for the DCI associated with the WUS comprises:
determining to stop PDCCH monitoring on either all secondary cells (SCells) or a subset of SCells when switched to a first BWP on a primary cell (PCell) or when switched to a first search space (SS) on the first BWP on the PCell; and monitoring the PDCCH for the DCI associated with the WUS when switched to the first BWP on the PCell or when switched to the first SS on the first BWP on the PCell.

18. A method comprising:

generating a configuration for monitoring a wake up signal (WUS), wherein the configuration comprises information indicative of one or more of: one or more component carriers (CCs), a bandwidth part (BWP), a control resource set (CORESET), and a search space (SS);

transmitting the configuration to one or more user equipment; and transmitting, on a physical downlink control channel (PDCCH), a downlink control information (DCI) associated with the WUS that comprises a common indication block that applies to a plurality of user equipment (UE) and a plurality of UE-specific indication blocks, wherein the UE-specific indication blocks include a plurality of fields including indication functions, wherein the plurality of fields each include information for different component carriers (CCs) or CC groups, and wherein the information is shared among the different CCs or CC groups to cause the UE to receive the WUS in response to detecting the DCI and based at least on the common indication block that applies to the plurality of UE and the plurality of UE-specific indication blocks.

19. A baseband processor comprising memory storing instructions that, when executed by the baseband processor, cause the baseband processor to perform operations comprising:

receiving a configuration for monitoring a wake up signal (WUS), wherein the configuration comprises information indicative of one or more of: one or more component carriers (CCs), a bandwidth part (BWP), a control resource set (CORESET), and a search space (SS), wherein the one or more component carriers (CCs) are a plurality of CCs that comprise a primary cell and secondary cells;

monitoring, based on the configuration, a physical downlink control channel (PDCCH) for downlink control information (DCI) associated with the WUS, wherein monitoring the PDCCH for the DCI associated with the WUS comprises:

determining to stop PDCCH monitoring on either all secondary cells (SCells) or a subset of SCells when switched to a first BWP on a primary cell (PCell) or when switched to a first search space (SS) on the first BWP on the PCell; and monitoring the PDCCH for the DCI associated with the WUS when switched to the first BWP on the PCell or when switched to the first SS on the first BWP on the PCell; and receiving the WUS in response to detecting the DCI.

20. The baseband processor of claim 19, the operations comprising:

detecting the DCI that comprises a common indication block that applies to a plurality of user equipment (UE) and a plurality of UE-specific indication blocks, wherein the UE-specific indication blocks include a plurality of fields including indication functions, wherein the plurality of fields each include information for different component carriers (CCs) or CC groups, and wherein the information is shared among the different CCs or CC groups, wherein:

receiving the WUS in response to detecting the DCI is based at least on the common indication block that applies to the plurality of UE and the plurality of UE-specific indication blocks.

* * * * *